(12) United States Patent
Yamamoto et al.

(10) Patent No.: US 9,605,123 B2
(45) Date of Patent: Mar. 28, 2017

(54) PROCESS FOR PRODUCING RESIN SUBSTRATE HAVING HARD COATING LAYER, AND RESIN SUBSTRATE HAVING HARD COATING LAYER

(75) Inventors: Kyoko Yamamoto, Tokyo (JP); Takashi Shibuya, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 25 days.

(21) Appl. No.: 13/541,874

(22) Filed: Jul. 5, 2012

(65) Prior Publication Data
US 2012/0276394 A1 Nov. 1, 2012

Related U.S. Application Data

(63) Continuation of application No. PCT/JP2011/051126, filed on Jan. 21, 2011.

(30) Foreign Application Priority Data

Jan. 22, 2010 (JP) .................................. 2010-012228

(51) Int. Cl.
| | | |
|---|---|---|
| B32B 27/08 | (2006.01) | |
| C08J 7/12 | (2006.01) | |
| B05D 7/02 | (2006.01) | |
| C08J 7/04 | (2006.01) | |
| B29C 71/02 | (2006.01) | |
| C23C 18/12 | (2006.01) | |
| B32B 27/28 | (2006.01) | |
| B05D 3/02 | (2006.01) | |
| B05D 3/06 | (2006.01) | |
| B05D 3/10 | (2006.01) | |

(52) U.S. Cl.
CPC ............... *C08J 7/123* (2013.01); *B05D 7/02* (2013.01); *C08J 7/047* (2013.01); *C08J 7/08* (2013.01); *C23C 18/122* (2013.01); *C23C 18/1233* (2013.01); *C23C 18/1295* (2013.01); *B05D 3/0209* (2013.01); *B05D 3/06* (2013.01); *B05D 3/107* (2013.01); *B32B 27/283* (2013.01); *C08J 2483/04* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 3,986,997 A | * | 10/1976 | Clark | ............................ 524/300 |
| 4,353,959 A | * | 10/1982 | Olson et al. | .................. 428/331 |
| 4,503,126 A | * | 3/1985 | Phillips et al. | ............... 428/412 |
| 5,948,484 A | * | 9/1999 | Gudimenko et al. | ......... 427/489 |
| 6,946,536 B2 | * | 9/2005 | Tashiro | ............................ 528/35 |
| 2004/0180557 A1 | * | 9/2004 | Park et al. | ..................... 438/787 |
| 2004/0211511 A1 | * | 10/2004 | Suzuki | ....................... 156/273.3 |
| 2010/0104878 A1 | * | 4/2010 | Matsuo et al. | ................ 428/429 |
| 2010/0140756 A1 | * | 6/2010 | Kozasa et al. | ................ 257/635 |
| 2010/0227161 A1 | | 9/2010 | Shibuya et al. | |
| 2010/0304133 A1 | * | 12/2010 | Maeda | .......................... 428/339 |
| 2012/0058333 A1 | | 3/2012 | Yamamoto et al. | |

FOREIGN PATENT DOCUMENTS

| | | |
|---|---|---|
| CN | 1422307 A | 6/2003 |
| CN | 1436104 A | 8/2003 |
| CN | 101305058 A | 11/2008 |
| EP | 0 588 038 A1 | 3/1994 |
| JP | 03-068475 | 3/1991 |
| JP | 06-136292 | 5/1994 |
| JP | 2001-089572 A | 4/2001 |
| JP | 2005-254033 | 9/2005 |
| JP | 2009166322 A * | 7/2009 |
| WO | WO 03022938 A2 * | 3/2003 |
| WO | WO2008078516 * | 7/2008 |
| WO | WO 2009/004821 A1 | 1/2009 |
| WO | 2009/110152 A1 | 9/2009 |

OTHER PUBLICATIONS

English Machine Translation of JP 2009166322 (2009).*
English machine translation from EPO for WO 03022938 (2003).*
172 nm Excimer VUV-Triggered Photodegradation and Micropatterning of Aminosilane Films, Elsner Thin Solid Films 517, 6772-6776. (2009).*
Ushio Search Light source/Search from Wave Length available on at URL of http://www.ushio.co.jp/en/products/light_source/lamp/excimer.htm (2016)l.*
U.S. Appl. No. 13/589,600, filed Aug. 20, 2012, Shibuya, et al.
U.S. Appl. No. 13/531,903, filed Jun. 25, 2012, Yamamoto, et al.
International Search Report issued Apr. 12, 2011 in PCT/JP2011/051126 filed Jan. 21, 2011.
U.S. Appl. No. 13/923,737, filed Jun. 21, 2013, Shibuya, et al.
U.S. Appl. No. 13/947,391, filed Jul. 22, 2013, Shibuya, et al.
Chinese Office Action issued Aug. 27, 2013, in Chinese Patent Application No. 2011800055742 filed Jan. 21, 2011 (with English translation).

* cited by examiner

*Primary Examiner* — Kenneth Stachel
(74) *Attorney, Agent, or Firm* — Oblon, McClelland, Maier & Neustadt, L.L.P.

(57) ABSTRACT

A process for producing a resin substrate having a hard coating layer on at least one side of a resin substrate, comprising, in the following order, a step of applying a hard coating composition containing an organopolysiloxane to at least one side of the resin substrate to form a coating film of the composition, and then applying a first heat treatment to the coating film to form a cured film; an irradiation step of applying a Xe₂ excimer light irradiation treatment to the cured film in an atmosphere having an oxygen concentration of at most 5 vol %; and a step of applying an oxidation treatment to the cured film obtained by the irradiation step and then further applying a second heat treatment to form the hard coating layer.

17 Claims, No Drawings

PROCESS FOR PRODUCING RESIN SUBSTRATE HAVING HARD COATING LAYER, AND RESIN SUBSTRATE HAVING HARD COATING LAYER

TECHNICAL FIELD

The present invention relates to a process for producing a resin substrate having a hard coating layer, and a resin substrate having a hard coating layer obtainable by this process.

BACKGROUND ART

In recent years, as a window glass for a vehicle such as an automobile and a window glass for a building material to be attached to a building construction such as a house or a building, demands for a transparent resin plate are increasing instead of a conventional inorganic glass plate. Particularly, for a vehicle such as an automobile, for weight saving, use of a transparent resin plate as a window material has been proposed, and especially, an aromatic polycarbonate transparent resin plate is excellent in fracture resistance, transparency, light weight properties, easy processability, etc., and its use has been studied as a promising window material for a vehicle. However, such a transparent resin plate has had problems with respect to the abrasion resistance when it is used in place of a glass plate. Therefore, it has been proposed to form a coating film on the surface of a transparent resin plate by means of various hard coating agents, for the purpose of improving the abrasion resistance of the transparent resin plate.

For such a hard coating agent, in order to form a coating film having high hardness, a condensation reaction of silanol groups which can form siloxane bonds is employed as the curing system, and an organopolysiloxane-containing composition to obtain a coating film having a higher performance with respect to the abrasion resistance, and a process for producing a resin substrate having a hard coating layer by using it, have been proposed. However, the abrasion resistance of an obtainable resin substrate having a hard coating layer has not yet been reached a satisfactory level at present.

On the other hand, among organopolysiloxane-containing compositions, particularly with respect to a silicone rubber, a process for producing a silicone rubber protective film having hardness imparted to its surface while keeping its interior being flexible by utilizing ultraviolet curing, has been proposed (Patent Document 1). However, such a silicone rubber protective film and the above hard coating are different in the performance of the surface hardness required, and even when this process is applied to curing of a hard coating agent, no satisfactory abrasion resistance can be imparted to a coating film obtainable.

Therefore, it has been desired to develop a hard coating agent which is capable of imparting sufficient abrasion resistance to a transparent resin substrate made of a polycarbonate type resin or the like expected to be useful as various window materials, particularly window materials for vehicles and which is capable of maintaining its excellent properties such as the transparency and fracture resistance for a long period of time, and a process for producing a resin substrate having a hard coating layer, which is capable of forming hard coating having sufficient abrasion resistance on the resin substrate.

PRIOR ART DOCUMENT

Patent Document

Patent Document 1: JP-A-2005-254033

DISCLOSURE OF INVENTION

Technical Problem

The present invention has been made to solve the above-described problems of the prior art, and it is an object of the present invention to provide a process for producing a resin substrate having a hard coating layer, which is capable of forming a hard coating layer having sufficient abrasion resistance on a resin substrate, and a resin substrate having a hard coating layer excellent in the abrasion resistance.

Solution to Problem

The process for producing a resin substrate having a hard coating layer of the present invention is a process for producing a resin substrate having a hard coating layer on at least one side of a resin substrate, comprising, in the following order, a step of applying a hard coating composition containing an organopolysiloxane to at least one side of the resin substrate to form a coating film of the composition, and then applying a first heat treatment to the coating film to form a cured film; an irradiation step of applying a $Xe_2$ excimer light irradiation treatment to the cured film in an atmosphere having an oxygen concentration of at most 5 vol %; and a step of applying an oxidation treatment to the cured film obtained by the irradiation step and then further applying a second heat treatment to form the hard coating layer.

Here, the oxygen concentration (vol %) employed in this specification is a percentage of the amount (volume) of oxygen present per unit volume in an atmosphere in which $Xe_2$ excimer light irradiation is carried out, based on the unit volume.

Further, "the cured film" to be employed in this specification means a cured film obtainable by condensation-curing of the hard coating composition containing an organopolysiloxane in a form of a coating film by heat as described hereinafter. "The hard coating layer" means a final state of a coating film to be provided on a resin substrate for surface protection, and in general, the above cured film is used as a hard coating layer as it is, but with respect to the hard coating layer of the present invention, a surface protective coating film obtainable by further applying surface treatments ($Xe_2$ excimer light irradiation treatment and oxidation treatment/second heat treatment) to the cured film corresponds to the hard coating layer.

Further, the present invention provides a resin substrate having a hard coating layer obtainable by the above production process of the present invention.

Advantageous Effects of Invention

According to the process for producing a resin substrate having a hard coating layer of the present invention, hard coating having sufficient abrasion resistance can be formed on a resin substrate. Further, the resin substrate having a hard coating layer of the present invention obtainable by this production process is excellent in the abrasion resistance.

DESCRIPTION OF EMBODIMENTS

Now, embodiments of the present invention will be described.

<Process for Producing Resin Substrate Having Hard Coating Layer of the Present Invention>

The resin substrate having a hard coating layer to be produced by the production process of the present invention is a resin substrate having a hard coating layer on at least one side of a resin substrate. Here, in this specification, "having a hard coating layer on a side of a resin substrate" means no only a case where the resin substrate has a hard coating layer directly on its side but also a case where the resin substrate has a hard coating layer via a functional layer such as a primer layer as described hereinafter on its side. That is, the production process of the present invention is applicable also to a resin substrate having a hard coating layer in such a constitution that a functional layer such as a primer layer and a hard coating layer are laminated in order on a resin substrate.

In production of such a resin substrate having a hard coating layer, the production process of the present invention comprises the after-mentioned (1) step of forming a cured film of a hard coating composition containing an organopolysiloxane (hereinafter referred to as "cured film forming step"), (2) $Xe_2$ excimer light irradiation step and (3) oxidation treatment/second heat treatment step.

(1) Cured Film Forming Step

The cured film forming step in the production process of the present invention is a step of applying a hard coating composition containing an organopolysiloxane to at least one side of the above resin substrate to form a coating film of the above composition, and applying a first heat treatment to the obtained coating film to form a cured film.

(1-1) Resin Substrate

The resin as a material of the resin substrate used in the present invention may, for example, be a polycarbonate resin, a polystyrene resin, an aromatic polyester resin, an acrylic resin, a polyester resin, a polyarylate resin, a polycondensation product of halogenated bisphenol A and ethylene glycol, an acrylic urethane resin, or a halogenated aryl group-containing acrylic resin.

Among them, a polycarbonate resin such as an aromatic polycarbonate resin or an acrylic resin such as a polymethyl methacrylate type acrylic resin is preferred, and a polycarbonate resin is more preferred. Further, among polycarbonate resins, particularly a bisphenol A type polycarbonate resin is preferred. The resin substrate may contain two or more types of the above thermoplastic resins, or may be a laminated substrate having two or more layers laminated by using such resins. Further, the shape of the resin substrate is not particularly limited, and it may be a flat plate or curved. Further, the color of the resin substrate is preferably colorless transparent or colored transparent.

(1-2) Preparation of Hard Coating Composition

The hard coating composition to be used in the production process of the present invention contains an organopolysiloxane as the essential component, and contains optional components added as the case requires within a range not to impair the effects of the present invention. The respective components contained in the hard coating composition will be described below.

(Organopolysiloxane)

As the organopolysiloxane contained in the hard coating composition to be used in the production process of the present invention, any curable organopolysiloxane may be used without any particular restriction.

Organopolysiloxanes are composed of silicon-containing bond units so-called M units, D units, T units or Q units. Among them, a curable organopolysiloxane is an oligomer-form polymer composed mainly of T units or Q units, and it may be a polymer composed solely of T units, a polymer composed solely of Q units, or a polymer composed of T units and Q units. Further, such polymers may contain a small amount of M units or D units.

In a curable organopolysiloxane, a T unit is a unit having one silicon atom, one hydrogen atom or monovalent organic group bonded to the silicon atom, and three oxygen atoms bonded to other silicon atoms (or functional groups which can be bonded to other silicon atoms). The monovalent organic group bonded to the silicon atom is a monovalent organic group wherein the atom bonded to the silicon atom is a carbon atom. The functional groups which can be bonded to other silicon atoms are hydroxy groups or groups which can be converted to hydroxy groups by hydrolysis (hereinafter referred to as hydrolyzable groups). The sum of the oxygen atoms bonded to other silicon atoms and the functional groups which can be bonded to other silicon atoms, is 3, and T units are classified into three types of units so-called T1, T2 and T3, depending upon the difference in number of the oxygen atoms bonded to other silicone atoms and the functional groups which can be bonded to other silicon atoms. In T1, the number of oxygen atoms bonded to other silicon atoms is 1, in T2, the number of such oxygen atoms is 2, and in T3, the number of such oxygen atoms is 3. In this specification, etc., an oxygen atom bonded to another silicon atom is represented by O*, and a monovalent functional group which can be bonded to another silicon atom is represented by Z.

Here, O* representing an oxygen atom bonded to another silicon atom, is an oxygen atom linking two silicon atoms and is an oxygen atom in a bond represented by Si—O—Si. Accordingly, O* is one present between silicon atoms of two silicon-containing bond units. In other words, O* represents an oxygen atom shared between two silicon atoms of two silicon-containing bond units. In the after-mentioned chemical formulae of the silicon-containing bond units, O* is represented as bonded to one silicon atom, but this O* is an oxygen atom shared by a silicon atom of another silicon-containing bond unit and does not mean that two silicon-containing bond units are bonded by a bond represented by Si—O*—O*—Si.

The above-mentioned M unit is a unit having three such organic groups and one O*; the D unit is a unit having two such organic groups and two O* (or one O*1 and one Z group); and the Q unit is a unit having no such an organic group and 4 O* (or a total of 4 i.e. from 1 to 3 O* and from 3 to 1 Z group). Each silicon-containing bond unit is formed from a compound having no oxygen atom (O*) bonded to another silicon atom (having only Z groups) (hereinafter sometimes referred to as a monomer). A monomer to form a T unit will be referred to as a T monomer. A monomer to form a M unit, a D unit or a Q unit may likewise be referred to as a M monomer, a D monomer or a Q monomer.

The monomer is represented by $(R'—)_a Si(—Z)_{4-a}$, wherein a is an integer of from 0 to 3, R' is a hydrogen atom or a monovalent organic group, and Z is a hydroxy group or a monovalent functional group which can be bonded to another silicon atom. In this chemical formula, a compound wherein a=3 is the M monomer; a compound wherein a=2 is the D monomer; a compound wherein a=1 is the T monomer; and a compound wherein a=0, is the Q monomer. In such monomers, the Z group is usually a hydrolyzable group. Further, in a case where 2 or 3 R' are present (in a case where a is 2 or 3), a plurality of R' may be different. R' is preferably one within the same scope as the after-mentioned preferred R.

A curable organopolysiloxane can be obtained by a reaction to convert some of Z groups in a monomer to O*. In a case where the organopolysiloxane is a copolymer comprising two or more silicon-containing bond units, such a copolymer is usually obtainable from a mixture of the respectively corresponding monomers. In a case where Z groups in a monomer are hydrolyzable groups, the Z groups are converted to hydroxy groups by a hydrolysis reaction, and then, by a dehydration condensation reaction between two hydroxy groups bonded to separate silicon atoms, the two silicon atoms will be linked via an oxygen atom (O*). In the curable organopolysiloxane, hydroxy groups (or non-hydrolyzed Z groups) remain, and at the time of curing of such a curable organopolysiloxane, such hydroxy groups or Z groups are reacted in the same manner as described above, for curing. The cured product of the curable organopolysiloxane is a three dimensionally crosslinked polymer, and a cured product of a curable organopolysiloxane having many T units or Q units will be a cured product having a high crosslink density. At the time of curing, Z groups of a curable organopolysiloxane are converted to O*, but it is considered that some of Z groups (particularly hydroxy groups) will remain, so that the cured product will have hydroxy groups. In a case where a curable organopolysiloxane is cured at a high temperature, there may be a case where no substantial hydroxy groups will remain in the cured product.

In a case where Z groups in a monomer are hydrolyzable groups, such Z groups may, for example, be alkoxy groups, chlorine atoms, acyloxy groups or isocyanate groups. In many cases, as a monomer, a monomer wherein Z groups are alkoxy groups, is used. Alkoxy groups are hydrolyzable groups having a relatively low reactivity as compared with e.g. chlorine atoms, and in a curable organopolysiloxane obtainable by using a monomer wherein Z groups are alkoxy groups, unreacted alkoxy groups are present together with hydroxy groups, as Z groups, in many cases. In a case where Z groups in a monomer are hydrolyzable groups having a relatively high reactivity (such as chlorine atoms), most of Z groups in a curable organopolysiloxane obtainable by using such a monomer will be hydroxy groups. Therefore, in a usual curable organopolysiloxane, Z groups in the respective units constituting it are hydroxy groups, or hydroxy groups and alkoxy groups, in many cases.

In the present invention, among such curable organopolysiloxanes, a curable organopolysiloxane composed of T units as the main silicon-containing bond units is preferably used. Hereinafter, a curable organopolysiloxane will be referred to simply as an organopolysiloxane unless otherwise specified. Here, in this specification, the organopolysiloxane composed of T units as the main constituting units (hereinafter referred to as "organopolysiloxane (T)" as the case requires) is an organopolysiloxane wherein the proportion in number of T units is from 50 to 100% to the total number of M units, D units, T units and Q units, and in the present invention, more preferably an organopolysiloxane wherein the proportion of T units is from 70 to 100%, particularly preferably an organopolysiloxane wherein the proportion of T units is from 90 to 100% is used. Further, as other units contained in a small amount in addition to T units, D units and Q units are preferred, and Q units are particularly preferred.

That is, in the present invention, among such curable organopolysiloxanes, an organopolysiloxane composed solely of T units and Q units, their proportion in number T:Q being 90 to 100:10 to 0, is particularly preferably used.

The proportions in number of M units, D units, T units and Q units in the organopolysiloxane can be calculated from values of peak area ratios by $^{29}$Si-NMR.

The organopolysiloxane (T) preferably used in the present invention is an organopolysiloxane having T units represented by the following T1 to T3.

$$R-Si(-OX)_2(-O^*-) \qquad \text{T1:}$$

$$R-Si(-OX)(-O^*-)_2 \qquad \text{T2:}$$

$$R-Si(-O^*-)_3 \qquad \text{T3:}$$

(wherein R is a hydrogen atom or a $C_{1-10}$ substituted or unsubstituted monovalent organic group, X is a hydrogen atom or a $C_{1-6}$ alkyl group, and O* is an oxygen atom linking two silicon atoms.)

In the above chemical formulae, R is not limited to one type, and each of T1, T2 and T3 may contain plural types of R. Further, in the above chemical formulae, —OX is a hydroxy group or an alkoxy group. Between T1 and T2, —OX may be the same or different. Two —OX in T2 may be different, and for example, one of them may be a hydroxy group and the other may be an alkoxy group. Further, when the two —OX are alkoxy groups, such alkoxy groups may be different alkoxy groups. However, as described hereinafter, the two alkoxy groups are usually the same alkoxy groups.

Further, a T unit having three —OX only without having an oxygen atom (O*) linking two silicon atoms, will be hereinafter referred to as T0. Actually, T0 corresponds to an unreacted T monomer contained in the organopolysiloxane and is not a silicon-containing bond unit. Such a T0 is measured in the same manner as T1 to T3 in the analysis of T1 to T3 units.

T0 to T3 in the organopolysiloxane can be analyzed by measuring the bonding states of silicon atoms in the organopolysiloxane by a nuclear magnetic resonance analysis ($^{29}$Si-NMR). The ratios in number of T0 to T3 are obtained from the peak area ratios in $^{29}$Si-NMR. —OX in the organopolysiloxane molecule can be analyzed by an infrared absorption analysis. The ratios in number of hydroxy groups and alkoxy groups bonded to silicon atoms can be obtained from the peak area ratios of the infrared absorption peaks of the two. The mass average molecular weight Mw, the number average molecular weight Mn and the dispersion degree Mw/Mn of the organopolysiloxane are values measured by using polystyrene as a standard substance by a gel permeation chromatography method. Such properties of an organopolysiloxane are not meant for the properties of a single molecular, but are obtained as average properties of the respective molecules.

A plurality of T1, T2 or T3 present in one molecule of the organopolysiloxane (T) may be two or more different types. For example, there may be two or more T2 different in R. Such an organopolysiloxane is obtainable from a mixture of two or more T monomers. For example, it is considered that in an organopolysiloxane obtainable from a mixture of two or more T monomers different in R, two or more T1, T2 and T3, respectively, different in R are present. The ratio in number of different R in an organopolysiloxane obtained from a mixture of a plurality of T monomers different in R, reflects the compositional ratio in the mixture of the T monomers different in R. However, the ratio in number of units different in R in each of T1, T2 and T3 does not necessarily reflect the compositional ratio in the mixture of the T monomers different in R, because, for example, even if three —OX in the T monomers are the same, the reactivities of the T monomers, T1 and T2 may be different due to the difference in R.

The organopolysiloxane (T) is preferably produced from at least one type of T monomers represented by R—Si(—OY)$_3$. In this formula, R is the same as the above-described R, and Y is a C$_{1-6}$ alkyl group. Y may be not only an unsubstituted alkyl group but also a substituted alkyl group such as an alkoxy-substituted alkyl group. Three Y in one molecule may be different. However, the three Y are usually the same alkyl group. Y is preferably an alkyl group having from 1 to 4 carbon atoms, more preferably 1 or 2 carbon atoms. Specifically, Y may, for example, be a methyl group, an ethyl group, a n-propyl group, a n-butyl group, a t-butyl group or a 2-methoxyethyl group.

R is a hydrogen atom or a C$_{1-10}$ substituted or unsubstituted monovalent organic group. The organic group is meant for an organic group wherein, as mentioned above, atoms bonded to silicon atoms are carbon atoms.

The unsubstituted monovalent organic group may be a hydrocarbon group such as an alkyl group, an alkenyl group, an alkynyl group, a cycloalkyl group, an aryl group or an aralkyl group. Such a hydrocarbon group is preferably a C$_{1-10}$ alkyl group, a C$_{2-10}$ alkenyl or alkynyl group, a C$_5$ or C$_6$ cycloalkyl group, a C$_{6-10}$ aryl group or a C$_{7-10}$ aralkyl group. Specifically, a methyl group, an ethyl group, a n-propyl group, a n-butyl group, an i-butyl group, a t-butyl group, a hexyl group, an octyl group, a decyl group, a vinyl group, an allyl group, a cyclohexyl group, a phenyl group, a benzyl group or a phenethyl group, may, for example, be mentioned.

The substituted monovalent organic group may, for example, be a hydrocarbon group having a hydrogen atom of a ring of e.g. a cycloalkyl group, an aryl group or an aralkyl group substituted by an alkyl group, or a substituted organic group having a hydrogen atom of the above mentioned hydrocarbon group substituted by e.g. a halogen atom, a functional group or a functional group-containing organic group. As the functional group, a hydroxy group, a mercapto group, a carboxy group, an epoxy group, an amino group or an cyano group may, for example, be preferred. As a halogen atom-substituted organic group, an alkyl group having a chlorine atom or a fluorine atom, such as a chloroalkyl group or a polyfluoroalkyl group, is preferred. As the functional group-containing organic group, an alkoxy group, an acyl group, an acyloxy group, an alkoxycarbonyl group, a glycidyl group, an epoxycyclohexyl group, an alkylamino group, a dialkylamino group, an arylamino group or an N-aminoalkyl-substituted aminoalkyl group is, for example, preferred. Particularly preferred is a chlorine atom, a mercapto group, an epoxy group, an amino group, an acryloyloxy group, a methacryloyloxy group, a glycidyl group, an alkylamino group or an N-aminoalkyl-substituted aminoalkyl group. A T monomer having a substituted organic group which is substituted by e.g. a functional group or a functional group-containing organic group, includes a compound in a category so-called a silane coupling agent.

As specific examples of the substituted organic group, the following organic groups may be mentioned: a 3-chloropropyl group, a 3,3,3-trifluoropropyl group, a 3-mercaptopropyl group, a p-mercaptomethylphenylethyl group, a 3-acryloyloxypropyl group, a 3-methacryloyloxypropyl group, a 3-glycidoxypropyl group, a 2-(3,4-epoxycyclohexyl)ethyl group, a 3-aminopropyl group, an N-phenyl-3-aminopropyl group, an N-(2-aminoethyl)-3-aminopropyl group, and a 2-cyanoethyl group.

As the above R, a particularly preferred monovalent organic group is a C$_{1-4}$ alkyl group. The organopolysiloxane (T) is preferably an organopolysiloxane which is obtainable by using one or more of T monomers each having a C$_{1-4}$ alkyl group. Further, the organopolysiloxane (T) is also preferably an organopolysiloxane which is obtainable by using at feast one of T monomers each having a C$_{1-4}$ alkyl group and a small amount of another T monomer. The proportion of such another T monomer is preferably at most 30 mol %, particularly preferably at most 15 mol %, based on the total amount of T monomers. As such another T monomer, preferred is a T monomer having a substituted organic group which is substituted by a functional group or a functional group-containing organic group, in a category so-called a silane coupling agent.

Specifically, a T monomer having a C$_{1-4}$ alkyl group may, for example, be methyltrimethoxysilane, methyltriethoxysilane, methyltripropoxysilane, ethyltrimethoxysilane or ethyltriethoxysilane. Particularly preferred is methyltrimethoxysilane or ethyltrimethoxysilane. As specific examples of a T monomer having a substituted organic group or the like, the following compounds may, for example, be mentioned.

Vinyltrimethoxysilane, vinyltriethoxysilane, phenyltrimethoxysilane, phenyltriethoxysilane, 3-chloropropyltrimethoxysilane, 3,3,3-trifluoropropyltrimethoxysilane, 3-mercaptopropyltrimethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-acryloyloxypropyltrimethoxysilane, 3-methacryloyloxypropyltrimethoxysilane, 3-aminopropyltrimethoxysilane, 3-aminopropyltriethoxysilane, N-(2-aminoethyl)-3-aminopropyltrimethoxysilane and 3-cyanoethyltrimethoxysilane.

A T monomer represented by (R'—)$_a$Si(—Z)$_{4-a}$ (a=1) other than the T monomer represented by R—Si(—OY)$_3$, may, for example, be methyltrichlorosilane, ethyltrichlorosilane, phenyltrichlorosilane, 3-glycidoxypropyltrichlorosilane, methyltriacetoxysilane or ethyltriacetoxysilane.

In a D monomer represented by (R'—)$_a$Si(—Z)$_{4-a}$ (a=2), the two R' may be the same or different. In a case where they are the same, they are preferably a C$_{1-4}$ alkyl group. In a case where they are different, it is preferred that one R' is a C$_{1-4}$ alkyl group, and the other R' is a substituted organic group which is substituted by the above mentioned functional group or functional group-containing organic group. Further, the Z group is preferably a C$_{1-4}$ alkoxy group, an acetoxy group or the like. As the D monomer, the following compounds may, for example, be mentioned.

Dimethyldimethoxysilane, dimethyldiethoxysilane, vinylmethyldimethoxysilane, vinylmethyldiethoxysilane, phenylmethyldimethoxysilane, phenylmethyldiacetoxysilane, 3-chloropropylmethyldimethoxysilane, 3,3,3-trifluoropropylmethyldimethoxysilane, 3-mercaptopropylmethyldiethoxysilane, 3-acryloyloxypropylmethyldimethoxysilane, 3-methacryloyloxypropylmethyldimethoxysilane, 3-aminopropylmethyldimethoxysilane, 3-aminopropylmethyldiethoxysilane, N-(2-aminoethyl)-3-aminopropylmethyldimethoxysilane and 3-cyanoethylmethyldimethoxysilane.

In a Q monomer represented by (R'—)$_a$Si(—Z)$_{4-a}$ (a=0), the four Z groups may be different, but they are usually the same. The Z group is preferably a C$_{1-4}$ alkoxy group, particularly preferably a methoxy group or an ethoxy group. As the Q monomer, the following compounds may, for example, be mentioned.

Tetramethoxysilane, tetraethoxysilane, tetra n-propoxysilane, tetra n-butoxysilane, tetra sec-butoxysilane and tetra t-butoxysilane.

The organopolysiloxane (T) to be used in the present invention can be obtained by subjecting the above T monomer or the like to partial hydrolytic condensation. Usually, this reaction is carried out by heating the T monomer or the like and water in a solvent. It is preferred that a catalyst is present in the reaction system. The desired organopolysiloxane can be produced by adjusting the reaction conditions such as the type of the monomer, the amount of water, the heating temperature, the type and amount of the catalyst, the reaction time, etc. In some cases, a commercially available organopolysiloxane may be used as the desired organopolysiloxane as it is, or the desired organopolysiloxane may be produced by using a commercially available organopolysiloxane.

The above catalyst is preferably an acid catalyst. The acid catalyst may, for example, be an inorganic acid such as hydrochloric acid, sulfuric acid, nitric acid, phosphoric acid, nitrous acid, perchloric acid or sulfamic acid, or an organic acid such as formic acid, acetic acid, propionic acid, butyric acid, oxalic acid, succinic acid, maleic acid, lactic acid or p-toluenesulfonic acid. Particularly preferred is acetic acid. The above solvent is preferably a hydrophilic organic solvent, particularly preferably an alcohol type solvent. The alcohol type solvent may, for example, be methanol, ethanol, 1-propanol, 2-propanol, 1-butanol, 2-butanol, 2-methyl-1-propanol, 2-ethoxyethanol, 4-methyl-2-pentanol or 2-buthoxyethanol. With respect to the reaction temperature, in a case where a catalyst is present, the reaction can be made at ordinary temperature. Usually, within a reaction temperature of from 20 to 80° C., a suitable temperature is selected for use depending upon the particular purpose.

The hydrolytic condensation reaction is a reaction whereby T1 is formed from T0 (T monomer), T2 is formed from T1, and T3 is formed from T2. The reaction rate is considered to be low in the order of the condensation reaction whereby T1 is formed from T0 having at least one hydrolyzable group converted to a hydroxy group, a condensation reaction whereby T2 is formed from T1 wherein at least one of the two —OX is a hydroxy group, and a condensation reaction whereby T3 is formed from T2 wherein —OX is a hydroxy group. Also in consideration of a hydrolysis reaction of a hydrolyzable group, it is considered that the peak of the amount of each unit to be present moves from T0 to T3 as the reaction proceeds. In a case where the reaction conditions are relatively mild, it is considered that the movement of the peak of the amount present proceeds relatively steadily. On the other hand, in a case where the reaction conditions are relatively vigorous, the reaction proceeds randomly, whereby the distribution of the amount of each unit present tends to be flat, and the amount of T0 or T1 present tends to be large as compared with the amount of T2 or T3 present. As described hereinafter, the organopolysiloxane (a) among the organopolysiloxanes (T) to be used in the present invention is an organopolysiloxane having a relatively high molecular weight wherein the amount of T0 or T1 present is small, and the ratio in the amount present of T2 to T3 is in a specific range, and such an organopolysiloxane can be produced by selecting relatively mild reaction conditions.

The reactivity for the above condensation reaction changes depending on R, and if R differs, the reactivity of a hydroxy group also changes. Usually, as R becomes small (for example, in a case where R is an alkyl group, as the number of carbon atoms in the alkyl group becomes small), the reactivity of a hydroxy group becomes high. Accordingly, it is preferred to select the T monomer taking into consideration the relation between the reactivity of the hydrolyzable group and the reactivity of the hydroxy group.

Further, the rate of the hydrolysis reaction of a hydrolyzable group to a hydroxy group changes depending upon the type of the hydrolyzable group, and it is preferred to take into consideration the relation with the rate of the condensation reaction. For example, in a case where an OX group in T2 is an alkoxy group, if its hydrolysis reaction rate is too slow, T2 wherein the OX group is a hydroxy group becomes less. Likewise, if the hydrolysis reaction rate is too slow, T1 wherein the OX group is a hydroxy group becomes less. Therefore, it becomes difficult to obtain an organopolysiloxane wherein the ratio in amount of the hydroxy group to the alkoxy group is high. Accordingly, the alkoxy group being an OX group is preferably an alkoxy group having a high reactivity i.e. an alkoxy group having a small number of carbon atoms, and a methoxy group is most preferred. In a case where the reactivity of a hydrolyzable group is sufficiently high, it is possible to obtain an organopolysiloxane having a high proportion of hydroxy groups from an organopolysiloxane having a high proportion of hydrolyzable groups without proceeding with the condensation reaction so much.

To the hard coating composition to be used in the present invention, only one type of the curable organopolysiloxane (T) thus obtained may be incorporated, or two or more may be incorporated in combination. As a particularly preferred combination of organopolysiloxanes (T) from the viewpoint of the abrasion resistance, a combination of an organopolysiloxane (a) and an organopolysiloxane (b) will be described below. However, the curable organopolysiloxane to be used in the present invention is not limited thereto. Further, each of the organopolysiloxane (a) and the organopolysiloxane (b) may be used by itself as the organopolysiloxane (T) in the present invention.

(Organopolysiloxane (a))

An organopolysiloxane (a) contains the respective units T1 to T3 in a ratio of T1:T2:T3=0-5:15-40:55-85 and in a ratio of T3/T2=1.5-4.0. Further, with respect to OX groups in the organopolysiloxane (a), the ratio of the number (B) of them being hydroxy groups to the number (A) of them being alkoxy groups i.e. (B)/(A) is at least 12.0 on molecular average. And, the mass average molecular weight of the organopolysiloxane (a) is from 800 to 8,000. Further, the organopolysiloxane (a) does not substantially contain T0 as a T monomer.

With respect to the proportions of T1, T2 and T3 constituting the organopolysiloxane (a), (T2+T3)/(T1+T2+T3) is preferably within a range of from 0.85 to 1.00, more preferably from 0.90 to less than 1.00. Further, with respect to T3/T2, a preferred range is from 2.0 to 4.0.

By adjusting the proportions of T1, T2 and T3 constituting the organopolysiloxane (a) to be in such ranges in an average composition of the respective molecules, it becomes possible that when the organopolysiloxane (a) is combined with the after-described organopolysiloxane (b) to form the hard coating composition of the present invention, the abrasion resistance of the hard coating layer finally obtainable can be improved.

The ratio of (B)/(A) in the organopolysiloxane (a) is a parameter indicating the condensation reactivity, and if this value becomes large, i.e. if the proportion of hydroxy groups becomes high as compared with alkoxy groups, the curing reaction at the time of forming the cured film will be accelerated when the organopolysiloxane (a) and the organopolysiloxane (b) are combined and used as a hard coating composition. Further, alkoxy groups which remain to be unreacted at the time of forming the cured film, are likely to lead to deterioration of the abrasion resistance of the hard coating layer finally obtainable and may cause microcracks if post curing proceeds, and therefore, the proportion of hydroxy groups should better be high as compared with alkoxy groups. The ratio of (B)/(A) in the organopolysiloxane (a) is at least 12.0, preferably at least 16.0. Further, (A) may be 0.

If the value of (B)/(A) is less than 12.0, the proportion of hydroxy groups tends to be too low as compared with alkoxy groups, whereby the effect to accelerate the curing reaction tends to be hardly obtainable, and by the influence of alkoxy groups, deterioration of the abrasion resistance is likely to be led, or post curing is likely to proceed to cause microcracks. That is, if the value of (B)/(A) is less than 12.0, at the time of forming the cured film, a part of the organopolysiloxane (a) may not be included in the three dimensional crosslink structure (network) formed by the curing reaction of the organopolysiloxane (a) and the organopolysiloxane (b) and is likely to bleed out, thus causing problems such that the crosslinking density decreases, the abrasion resistance cannot be obtained, and the curing tends to hardly proceed.

The mass average molecular weight of the organopolysiloxane (a) is from 800 to 8,000, preferably from 1,000 to 6,000. As the mass average molecular weight of the organopolysiloxane (a) is within this range, it is possible that when the organopolysiloxane (a) and the organopolysiloxane (b) are used in combination for the hard coating composition of the present invention, it is possible to improve the abrasion resistance of the hard coating layer finally obtainable.

In the present invention, in order to obtain an organopolysiloxane (a) to be used for a hard coating composition to form a hard coating layer excellent particularly in the abrasion resistance, it is preferred to use a raw material hydrolyzable silane compound wherein at least 70 mass % of all T monomers is a methyl trialkoxysilane, wherein the number of carbon atoms of the alkoxy groups is from 1 to 4. However, for the purpose of improving the adhesion or providing functions such as hydrophilicity, water repellency, etc., T monomers other than the methyl trialkoxysilane may be used in combination in a small amount.

As a method for producing the organopolysiloxane (a) as mentioned above, the T monomer or the like is subjected to a hydrolytic condensation reaction in a solvent in the presence of an acid catalyst. Here, water required for the hydrolysis is usually from 1 to 10 equivalents, preferably from 1.5 to 7 equivalents, more preferably from 3 to 5 equivalents, per 1 equivalent of the monomer. The hydrolysis and condensation of the monomer can be carried out in a reaction system where a colloidal silica (as described hereinafter) is present, and in a case where an aqueous dispersion type colloidal silica is used as such a colloidal silica, water is supplied from such an aqueous dispersion. The amount of the acid catalyst to be used is preferably from 0.1 to 50 parts by mass, particularly preferably from 1 to 20 parts by mass, per 100 parts by mass of the monomer. As the solvent, the above-mentioned alcohol type solvent is preferred, and specifically, methanol, ethanol, 2-propanol, 1-butanol or 2-butanol is particularly preferred from such a viewpoint that the solubility of the obtainable organopolysiloxane (a) will be good.

Usually, the reaction temperature is from 20 to 40° C., and the reaction time is from 1 hour to a few days. The hydrolytic condensation reaction of the monomer is an exothermic reaction, but the temperature of the system should better not exceed 60° C. It is preferred that under such conditions, the hydrolysis reaction is sufficiently proceeded, and then for the stability of the obtainable organopolysiloxane, the condensation reaction is proceeded at a temperature of from 40 to 80° C. for from 1 hour to a few days.

The organopolysiloxane (a) may also be produced from a commercially available organopolysiloxane. A commercially available organopolysiloxane is usually an organopolysiloxane wherein the proportion of alkoxy groups is high as compared with hydroxy groups, and accordingly, it is preferred that by using a commercially available organopolysiloxane similar to the desired organopolysiloxane (a) except for the ratio of (B)/(A), the proportion of hydroxy groups is increased by a hydrolysis reaction to produce the organopolysiloxane (a).

A commercially available organopolysiloxane useful as a raw material for the organopolysiloxane (a), may, for example, be the following organopolysiloxane which is a partial hydrolytic condensation product of methyltrimethoxysilane. Here, the symbol "ND" means that when the peak area ratio of $^{29}$Si-NMR is measured by means of nuclear magnetic resonance analyzer ECP400 (tradename) manufactured by JEOL Ltd., the result is not more than a detectable level (the same applies hereinafter).

Methyl type silicone resin KR-220L (tradename, manufactured by Shin-Etsu Chemical Co., Ltd.); T0:T1:T2:T3=ND:ND:28:72, Si—OH/SiO—$CH_3$=11.7, mass average molecular weight Mw=4,720, number average molecular weight Mn=1,200, Mw/Mn=3.93.

Methyl type silicone resin KR-500, (tradename, manufactured by Shin-Etsu Chemical Co., Ltd.); T0:T1:T2:T3=ND:15:58:27, the peak attributable to the Si—OH group is not detected by FT-IR, substantially only SiO—$CH_3$ is present. Mw=1,240, Mn=700, Mw/Mn=1.77.

In a case where an organopolysiloxane (a) is produced from such a commercially available organopolysiloxane, it is preferred to subject the commercially available organopolysiloxane to mainly the hydrolysis of alkoxy groups in the presence of an acid catalyst. For example, a method may be mentioned wherein to the commercially available organopolysiloxane, a solvent in an amount of from 0 to 10 times (by mass) is added and thoroughly mixed, and then an aqueous acid solution at a concentration of from about 0.1 to 70 mass % is added, followed by stirring at a temperature of from 15 to 80° C., preferably from 20 to 70° C., for from 1 to 24 hours. As the solvent to be used, water may be used, or the above mentioned alcohol type solvent having water added thereto, may also be used.

(Organopolysiloxane (b))

The organopolysiloxane (b) used in combination with the above organopolysiloxane (a) for the hard coating composition to be used in the present invention, is an organopolysiloxane having a mass average molecular weight between 1/10 and 1/1.5 (that is, between 0.1 and 0.67 time) of the mass average molecular weight of the organopolysiloxane (a). The organopolysiloxane (b) is an organopolysiloxane having a mass average molecular weight smaller than the organopolysiloxane (a) to be combined and has the above-described units T1 to T3. The ratio in number of T1:T2:T3, the ratio of T3/T2 and the ratio of (B)/(A) are not particularly limited.

The mass average molecular weight of the organopolysiloxane (b) is preferably between 1/8 and 1/1.5 (that is, between 0.125 and 0.67 times) of the mass average molecular weight of the organopolysiloxane (a) to be combined. If the mass average molecular weight of the organopolysiloxane (b) exceeds 1/1.5 of the mass average molecular weight of the organopolysiloxane (a), i.e. if the mass average molecular weight of the organopolysiloxane (a) is less than 1.5 times the mass average molecular weight of the organopolysiloxane (b), the toughness of the hard coating layer finally obtainable tends to be low, and such becomes a cause to form cracks. Further, if the mass average molecular weight of the organopolysiloxane (b) is less than 1/10 of the mass average molecular weight of the organopolysiloxane (a), i.e. if the mass average molecular weight of the organopolysiloxane (a) exceeds ten times the mass average molecular weight of the organopolysiloxane (b), the abrasion resistance of the hard coating layer finally obtainable tends to be low, it may be difficult to obtain a hard coating layer having sufficient abrasion resistance.

A more preferred organopolysiloxane (b) is an organopolysiloxane wherein the respective silicon-containing bond units represented by T0, T1, T2 and T3 are within a range of T0:T1:T2:T3=0-5:0-50:5-70:10-90, in a ratio by number of such units. The proportions of T0 and T1 in the organopolysiloxane (b) being large usually indicates that at the time of producing such an organopolysiloxane, the hydrolysis reaction or the condensation reaction of the raw material monomer was insufficient. In the organopolysiloxane (b), if the proportions of T0 and T1 are large, at the time of heat curing to form the cured film by using a hard coating composition comprising it and the organopolysiloxane (a), formation of cracks tends to increase. Further, usually, if the condensation reaction of the raw material monomer is proceeded too much at the time of producing an organopolysiloxane, the proportion of T3 in the obtainable organopolysiloxane tends to be high. In the organopolysiloxane (b), if the proportion of T3 becomes higher than necessary, a proper crosslinking reaction tends to be difficult at the time of heat curing to form the cured film by using the hard coating composition comprising it and the organopolysiloxane (a), whereby the cured film may not be formed, or it becomes difficult to finally obtain a hard coating layer having sufficient abrasion resistance.

The organopolysiloxane (b) can be produced from a T monomer or the like in the same manner as the organopolysiloxane (a). Further, a commercially available organopolysiloxane may be used as it is, as the organopolysiloxane (b). The following organopolysiloxanes may, for example, be mentioned as commercially available organopolysiloxanes which can be used as the organopolysiloxane (b). Here, the symbol "trace" means that when the peak area ratio of $^{29}$Si-NMR is measured by means of a nuclear magnetic resonance analyzer ECP400 (tradename) manufactured by JEOL Ltd., it is at least 0.01 and at most 0.25 (the same applies hereinafter).

TOSGUARD 510 (tradename, manufactured by Momentive Performance Materials, Inc.); molecular weight: Mn=1, 370, Mw=1,380, Mw/Mn=1.01. Number of T units: (total amount of the respective numbers of M units, D units and Q units)=at least 99.9:ND. T0:T1:T2:T3=ND:2:36:62.

KP851 (tradename: manufactured by Shin-Etsu Chemical Co., Ltd.); molecular weight: Mn=1,390, Mw=1,400, Mw/Mn=1.01. Number of T units: (total amount of the respective numbers of M units, D units and Q units)=at least 99.9:ND. T0:T1:T2:T3=trace:21:58:21.

Further, the ratio in content of the organopolysiloxane (b) to the organopolysiloxane (a) in the after-mentioned hard coating composition to be used in the present invention is preferably from 1.5 to 30 times, more preferably from 2 to 15 times, by mass ratio. When the hard coating composition to be used in the present invention contains components (a) and (b) in such a ratio, the three dimensional crosslinking structure of organopolysiloxanes formed by the curing reaction will be one having the organopolysiloxane component (a) partially incorporated in the three dimensional crosslinking structure composed mainly of the organopolysiloxane (b), whereby the weather resistance of a hard coating layer finally obtainable will be good.

The hard coating composition to be used in the present invention contains the above curable organopolysiloxane, preferably the organopolysiloxane (T). The content of the organopolysiloxane in the hard coating composition is preferably from 50 to 100 mass %, more preferably from 60 to 95 mass %, based on the total amount of the composition excluding the solvent (hereinafter referred to as "the non-volatile component" as the case requires). In the present invention, the amount of the nonvolatile component is measured on the basis of a change in mass after the hard coating composition being left at 150° C. for 45 minutes (Optional Components)

The hard coating composition to be used in the present invention may contain various additives in addition to the above organopolysiloxane. For example, in order to further improve the abrasion resistance of the hard coating layer of the resin substrate having a hard coating layer of the present invention, a hard coating composition containing fine silica particles is preferred. Therefore, it is preferred to incorporate colloidal silica in the hard coating composition. Here, the colloidal silica is meant for one having fine silica particles dispersed in water or an organic solvent such as methanol, ethanol, isobutanol or propylene glycol monomethyl ether.

Otherwise, fine silica particles may be incorporated to the raw material monomer in a step of producing the organopolysiloxane. By producing the organopolysiloxane in a reaction system containing colloidal silica, it is possible to obtain the organopolysiloxane containing fine silica particles. For example, by adding a T monomer and, if required, water or an acid catalyst, to colloidal silica, it is possible to produce the organopolysiloxane as described above in the dispersion of colloidal silica. By using the organopolysiloxane thus obtained, it is possible to produce a hard coating composition of the present invention containing fine silica particles.

The fine silica particles to be used for the hard coating composition of the present invention preferably has an average particle size (BET method) of from 1 to 100 nm. If the average particle size exceeds 100 nm, the particles will diffusely reflect light, whereby the haze value of the obtainable hard coating layer tends to be large, such being undesirable from the viewpoint of the optical quality. Further, the average particle size is particularly preferably from 5 to 40 nm, whereby the transparency of the hard coating layer can be maintained while imparting the abrasion resistance to the hard coating layer. Further, the colloidal silica may be used in either in a water-dispersed type or an organic solvent-dispersed type, but it is preferred to use a water-dispersed type. Further, it is particularly preferred to use colloidal silica dispersed in an acidic aqueous solution. Further, to the colloidal silica, fine inorganic particles other than fine silica particles, such as alumina sol, titanium sol or ceria sol, may be incorporated.

The content of the fine silica particles in the hard coating composition to be used in the present invention is preferably from 1 to 50 mass %, more preferably from 5 to 40 mass %, based on the total amount of the composition excluding the solvent (the non-volatile component). If the content of the fine silica particles in the non-volatile component in the hard coating composition to be used in the present invention is less than 1 mass %, adequate abrasion resistance may not be secured in the obtainable hard coating layer, and if the content exceeds 50 mass %, the proportion of the organopolysiloxane in the non-volatile component tends to be too low, whereby it tends to be difficult to form the cured film by heat curing of the organopolysiloxane, cracking is likely to be formed in the hard coating layer finally obtainable, or aggregation of fine silica particles is likely to take place to deteriorate the transparency of the hard coating layer.

The hard coating composition to be used in the present invention may further contain an additive such as a defoaming agent or a viscosity-adjusting agent for the purpose of improving the coating properties, may contain an additive such as an adhesion-imparting agent for the purpose of improving the adhesion to the primer layer, or may contain a leveling agent as an additive for the purpose of improving the coating properties and the smoothness of the coating film thereby obtainable. The amounts of such additives to be incorporated are preferably from 0.01 to 2 parts by mass of each additive, based on 100 parts by mass of the organopolysiloxane. Further, the hard coating composition to be used in the present invention may contain a dye, a pigment, a filler, etc. within a rage not to impair the purpose of the present invention.

The hard coating composition to be used in the present invention may further contain a curing catalyst. The curing catalyst may, for example, be an alkali metal salt such as a lithium salt, a sodium salt or a potassium salt, of an aliphatic carboxylic acid (such as formic acid, acetic acid, propionic acid, butyric acid, lactic acid, tartaric acid or succinic acid); a quaternary ammonium salt such as a benzyltrimethylammonium salt, a tetramethylammonium salt or a tetraethylammonium salt; a metal alkoxide or chelate of e.g. aluminum, titanium or cerium; ammonium perchlorate, ammonium chloride, ammonium sulfate, sodium acetate, an imidazole or its salt, ammonium trifluoromethyl sulfonate, or bis(trifluoromethylsulfonyl)bromomethyl ammonium. Here, the amount of the curing catalyst to be incorporated is preferably from 0.01 to 10 parts by mass, more preferably from 0.1 to 5 parts by mass, per 100 parts by mass of the organopolysiloxane. If the content of the curing catalyst is less than 0.01 part by mass, a sufficient curing rate tends to be hardly obtainable, and if it exceeds 10 parts by mass, the storage stability of the hard coating composition tends to be deteriorated, or precipitates are likely to be formed.

Further, the hard coating composition to be used in the present invention preferably further contains an ultraviolet absorber to prevent yellowing of the resin substrate. Such an ultraviolet absorber may, for example, be a benzophenone type ultraviolet absorber, a benzotriazole type ultraviolet absorber, a benzimidazole type ultraviolet absorber, a cyanoacrylate type ultraviolet absorber, a salicylate type ultraviolet absorber, a benzylidenemalonate type ultraviolet absorber or a triazine type ultraviolet absorber. One type of such ultraviolet absorbers may be used alone, or two or more types may be used in combination. Further, in order to prevent bleeding out of such an ultraviolet absorber from the hard coating layer finally obtainable, an ultraviolet absorber having a trialkoxysilyl group may be used. The trialkoxysilyl group in such an ultraviolet absorber will be converted to a hydroxy group by a hydrolysis reaction at the time of forming the cured film by heat curing of the organopolysiloxane, and then incorporated in the cured film by a dehydration condensation reaction, and as a result, it is possible to prevent bleeding out of the ultraviolet absorber from the hard coating layer. Specifically, such a trialkoxysilyl group may, for example, be a trimethoxysilyl group or a triethoxysilyl group. The content of the ultraviolet absorber in the hard coating composition is preferably from 0.1 to 50 parts by mass, particularly preferably from 0.1 to 30 parts by mass, per 100 parts by mass of the organopolysiloxane.

Further, in the present invention, in order to prevent gelation of the hard coating composition at ordinary temperature and to increase the storage stability, it is preferred to adjust the pH of the hard coating composition to be from 3.0 to 6.0, more preferably from 4.0 to 5.5. If the pH is at most 2.0 or at least 7.0, hydroxy groups bonded to silicon atoms tend to be very unstable, such being not suitable for storage. As a means to adjust the pH, addition of an acid or adjustment of the content of the curing catalyst may, for example, be mentioned. Such an acid may, for example, be an inorganic acid such as hydrochloric acid, sulfuric acid, nitric acid, phosphoric acid, nitrous acid, perchloric acid or sulfamic acid, or an organic acid such as formic acid, acetic acid, propionic acid, butyric acid, oxalic acid, succinic acid, maleic acid, lactic acid or p-toluenesulfonic acid.

The hard coating composition to be used in the present invention is usually prepared in a form wherein the organopolysiloxane as the essential component, and various additives as optional components, are dissolved or dispersed in a solvent. It is necessary that all non-volatile components in the hard coating composition are stably dissolved or dispersed in the solvent, and for such a purpose, the solvent contains an alcohol in an amount of at least 20 mass %, preferably at least 50 mass %.

As the alcohol to be used for such a solvent, methanol, ethanol, 1-propanol, 2-propanol, 1-butanol, 2-butanol, 2-methyl-1-propanol, 1-methoxy-2-propanol, 2-ethoxyethanol, 4-methyl-2-pentanol or 2-butoxyethanol is preferred. Among them, an alcohol having a boiling point of from 80 to 160° C. is preferred from such a viewpoint that the solubility of the organopolysiloxane is good, and the coating properties on the resin substrate are good. Specifically, ethanol, 1-propanol, 2-propanol, 1-butanol, 2-butanol, 2-methyl-1-propanol, 1-methoxy-2-propanol, 2-ethoxyethanol, 4-methyl-2-pentanol or 2-butoxyethanol is preferred.

Further, the solvent to be used for the hard coating composition of the present invention includes a lower alcohol or the like generated along the hydrolysis of the raw material monomer such as an alkyltrialkoxysilane at the time of producing the organopolysiloxane, water in the water-dispersed type colloidal silica, which is not involved in the hydrolysis reaction, and, in a case where an organic solvent-dispersed type colloidal silica is used, such a dispersing organic solvent.

Further, in the hard coating composition to be used in the present invention, a solvent other than the alcohol which can be mixed with water/alcohol, may be used in combination as a solvent other than the above described solvent, and as such a solvent, a ketone such as acetone or acetyl acetone; an ester such as ethyl acetate or isobutyl acetate, or an ether such as propylene glycol monomethyl ether, dipropylene glycol monomethyl ether or diisopropyl ether may be mentioned.

The amount of the solvent to be used in the hard coating composition of the present invention is preferably from 50 to 3,000 parts by mass, more preferably from 150 to 2,000 parts by mass, per 100 parts by mass of the total non-volatile component in the hard coating composition.

The hard coating composition to be used in the present invention is obtainable by uniformly mixing the above-described various components by a conventional method.

(1-3) Coating/Curing

In (1) the cured film forming step in the production process of the present invention, the hard coating composition prepared as mentioned above is applied to at least one side of the above resin substrate to form a coating film of the hard coating composition, and the obtained coating film is cured. In a case where a resin substrate having a hard coating layer has various functional layers such as a primer layer between the resin substrate and the hard coating layer, the hard coating composition is applied to the primer layer or the like and is cured.

The method for applying the hard coating composition is not particularly limited and may, for example, be a usual coating method such as a spray coating method, a dip coating method or a flow coating method. It is preferred to suitably adjust the viscosity, the solid content concentration, etc. of the hard coating composition depending upon the coating method.

The thickness (the thickness before curing) of a coating film formed by applying the hard coating composition to the surface of the resin substrate or the like, depends on the solid content concentration in the composition. It is preferably suitably adjusted, for example, by taking the solid content concentration into consideration, so that the film thickness after curing will be within the predetermined range.

The thickness of the cured film formed on the resin substrate is preferably at least 0.1 µm and at most 20 µm, more preferably at least 1 µm and at most 10 µm, particularly preferably at least 2 µm and at most 10 µm, in its state after curing as described hereinafter. In the production process of the present invention, the thickness will not be changed by (2) the $Xe_2$ excimer light irradiation and (3) the oxidation treatment/second heat treatment which are further applied to the cured film obtainable after curing the coating film. Accordingly, the following thickness after curing, i.e. the thickness of the cured film can be regarded as the final thickness of the hard coating layer finally obtainable. If the thickness of the hard coating layer is too thin, it becomes difficult to secure sufficient abrasion resistance even by the production process of the present invention. On the other hand, if the thickness of the hard coating layer is too thick, cracking or delamination is likely to occur. Accordingly, in order to prevent cracking or delamination while securing sufficient abrasion resistance, the thickness of the cured film (that is, the thickness of the hard coating layer excluding the thickness of the primer layer) is preferably at least 0.1 µm and at most 20 µm.

Then, a first heat treatment is applied to the coating film of the hard coating composition formed on at least one side of the resin substrate or the like, whereby the above organopolysiloxane is cured. In this specification, "the hard coating composition is cured" in some cases means that the organopolysiloxane contained in the hard coating composition is cured. Further, prior to this treatment, drying operation may be carried out as the case requires.

Drying is carried out by leaving the coating film of the hard coating composition formed on the resin substrate as mentioned above usually under a temperature condition of from ordinary temperature to less than the heat deformation temperature of the resin substrate for a certain time, whereby a part of or the entire solvent in the coating film is removed. The conditions for drying the solvent may, for example, be specifically drying conditions of leaving the coating film at a temperature of from 0 to 60° C. for from 10 minutes to 10 hours. Further, removal of the solvent may be carried out e.g. by vacuum drying while adjusting the degree of vacuum.

In the production process of the present invention, after drying which is optionally carried out, a first heat treatment is applied to the coating film of the hard coating composition to form a cured film. This first heat treatment in the production process of the present invention applied to the coating film of the hard coating composition may be the same treatment as a conventional treatment for condensation curing of the hard coating composition.

The first heat treatment applied to the above obtained coating film is preferably carried out at a high temperature within a range where there will be no problem with respect to the heat resistance of the resin substrate, whereby curing can be completed quickly. However, for example, in a case where an organopolysiloxane having a methyl group as a monovalent organic group is used, if the temperature during the heat curing is 250° C. or higher, the methyl group will be detached by heat decomposition, such being undesirable. Therefore, the curing temperature is preferably from 50 to 200° C., more preferably from 80 to 160° C., particularly preferably from 100° C. to 140° C. Further, the heating means may, for example, be a heating method by a natural convection incubator, a constant temperature dryer, a hot air circulation system dryer, a forced air flow dryer or a vacuum drying apparatus. Further, an electric furnace or the like may be employed. Further, it is possible to optionally employ a heating means using an infrared lamp. Such heating means may be employed alone or in combination of two or more.

The time required for the first heat treatment in the production process of the present invention is not particularly limited so long as the organopolysiloxane contained in the hard coating composition constituting the coating film is sufficiently condensation cured, whereby a three dimensional structure by siloxane bonds is formed. However, it is preferably from 10 minutes to 4 hours, particularly preferably from 20 minutes to 3 hours, especially preferably from 30 minutes to 2 hours.

(2) $Xe_2$ Excimer Light Irradiation Step

The $Xe_2$ excimer light irradiation step in the production process of the present invention is a step of applying irradiation treatment by $Xe_2$ excimer light to the cured film formed on the surface of the resin substrate or the like in the above (1) cured film forming step in an atmosphere having an oxygen concentration of at most 5 vol %.

$Xe_2$ excimer light is an ultraviolet ray having a wavelength of 172 nm, and by irradiating the surface of the cured film obtained in the above (1) with $Xe_2$ excimer light, it is possible to change the surface structure of the cured film, specifically, to specifically cleave the bonds between silicon atoms and carbon atoms present on the surface of the cured film. In the cured film of the hard coating composition containing the organopolysiloxane, in the interior of the cured film, a three dimensional crosslinking structure (network) is formed by siloxane bonds, and on the surface of the cured film, structures of —$SiCH_3$, —$SiC_2H_5$, etc. in which a monovalent organic group, for example, an alkyl group such as a methyl group or an ethyl group is bonded to a silicon atom, are present in a large amount. When the surface of such a cured film is irradiated with $Xe_2$ excimer light, all or some of the bonds between silicon atoms and oxygen atoms are cleaved, and for example, in the case of —$SiCH_3$, the bond is cleaved to let the methyl group off, whereby a radical such as Si— will form. In the production process of the present invention, as mentioned above, irradiation with $Xe_2$ excimer light is employed as a means of cleaving the bonds between silicon atoms and carbon atoms on the surface of the cured film obtained in the above (1) to form Si radicals on the surface of the cured film, because the $Xe_2$ excimer light having a wavelength of 172 nm can effectively cleave the bonds between silicon atoms and carbon atoms as compared with ultraviolet rays having the other wavelengths.

Here, when the surface of the cured film is irradiated with $Xe_2$ excimer light, if oxygen is present in the atmosphere, as oxygen selectively absorbs the $Xe_2$ excimer light, the amount of the $Xe_2$ excimer light which reaches the surface of the cured film will be reduced, and the efficiency of cleaving the silicon atom-carbon atom bonds will remarkably be lowered. Further, oxygen is converted to ozone by irradiation with $Xe_2$ excimer light, and the resulting ozone may cause deterioration of the surface of the cured film or the primer layer or further the resin substrate. Accordingly, the $Xe_2$ excimer light irradiation to the cured film of the hard coating composition formed on the resin substrate is carried out in an atmosphere having an oxygen concentration of at most 5 vol %, preferably at most 3 vol %, more preferably at most 1 vol %. Specifically, it is carried out in an inert gas which does not absorb the $Xe_2$ excimer light and is insusceptible to the $Xe_2$ excimer light irradiation, for example, in an atmosphere replaced with e.g. a nitrogen or argon gas.

The $Xe_2$ excimer light irradiation treatment to the surface of the cured film of the hard coating composition is preferably a treatment such that the $Xe_2$ excimer light irradiation energy on the surface of the cured film is from 300 to 9,000 $mJ/cm^2$, more preferably from 500 to 8,000 $mJ/cm^2$, particularly preferably from 1,000 to 8,000 $mJ/cm^2$. If the $Xe_2$ excimer light irradiation energy is smaller than 300 $mJ/cm^2$, cleavage of the silicon atom-carbon atom bonds on the surface of the cured film will not sufficiently be accelerated, and no sufficient abrasion resistance may be imparted to the hard coating layer finally obtainable. Further, if the $Xe_2$ excimer light irradiation energy is larger than 9,000 $mJ/cm^2$, not only the silicon atom-carbon atom bonds on the surface of the cured film but also such bonds at a deeper portion or even silicon atom-oxygen atom bonds constituting the cured film are cleaved, whereby in the subsequent heat treatment (second heat treatment), formation of cracks may be accelerated due to shrinkage stress by the shrinkage on curing in some cases.

In the production process of the present invention, the $Xe_2$ excimer light irradiation to the surface of the cured film of the hard coating composition may be carried out, specifically, by means of a $Xe_2$ excimer UV lamp. The $Xe_2$ excimer UV lamp is not particularly limited, and a $Xe_2$ excimer UV lamp to be used for irradiation with the $Xe_2$ excimer light in various applications can be used in the production process of the present invention. Such a $Xe_2$ excimer UV lamp may be a commercially available excimer irradiation apparatus, for example, a standard excimer irradiation unit (emission irradiance: 10 $mW/cm^2$, manufactured by USHIO INC.), a separate type excimer ultraviolet irradiation apparatus (emission irradiance: 35 $mW/cm^2$, manufactured by IWASAKI ELECTRIC CO., LTD.) or a lamp house type excimer UV light source (E500-172, emission irradiance: 10 $mW/cm^2$, manufactured by Excimer Inc.). It is properly selected depending upon the shape of the resin substrate.

The $Xe_2$ excimer light irradiation is carried out by using such a $Xe_2$ excimer UV lamp, and for example, in a case where the irradiation treatment is carried out by using a $Xe_2$ excimer UV lamp with an emission irradiance of 10 $mW/cm^2$, in order that the $Xe_2$ excimer light irradiation energy on the surface of the cured film will be within the above preferred range, a method may be mentioned wherein the lamp is placed in a sealable chamber, and at a distance of from about 0.1 to about 10 mm from the lamp, the resin substrate having the cured film of the hard coating composition with a predetermined area is placed with the cured film facing the lamp so that the entire surface of the cured film can uniformly be irradiated with the $Xe_2$ excimer light, and the $Xe_2$ excimer light irradiation is carried out in a nitrogen gas atmosphere for from 1 to 15 minutes.

Here, a state where the silicon atom-carbon atom bonds present on the surface of the cured film of the hard coating composition are cleaved by the $Xe_2$ excimer light irradiation, whereby the number of organic groups bonded to silicon atoms is decreased as compared with that before irradiation, can be confirmed e.g. by an infrared absorption analysis by using e.g. FT-IR or by a surface compositional analysis by using a scanning X-ray photoelectron spectrometer, with respect to the surface of the hard coating layer of the resin substrate having a hard coating layer finally obtainable. In the production process of the present invention, for example, the proportion of the number of organic groups on the surface of the cured film measured by the infrared absorption analysis after the $Xe_2$ excimer light irradiation to the number before the $Xe_2$ excimer light irradiation is preferably at most 95%, more preferably at most 90%. The lower limit of this proportion may be 0%, that is, all the organic groups on the surface of the cured film are cut off after the $Xe_2$ excimer light irradiation. However, in view of acceleration of formation of cracks, etc. resulting from the shrinkage stress by the shrinkage on curing in the subsequent heat treatment (second heat treatment), the proportion is preferably at a level of 80%.

(3) Oxidation Treatment/Second Heat Treatment Step (3) The oxidation treatment/second heat treatment step in the production process of the present invention is a step of applying an oxidation treatment to the cured film obtained by the above $Xe_2$ excimer light irradiation step and further applying a second heat treatment thereto to form a hard coating layer.

The oxidation treatment is sufficiently carried out usually by taking the cured film obtained by the above $Xe_2$ excimer light irradiation step from the above sealed state with an oxygen concentration of at most 5 vol % to the air. However, as the case requires, it is possible to positively carry out the oxidation treatment e.g. by a method of exposing it to the dry air, an oxygen atmosphere or a water vapor atmosphere immediately after the excimer light irradiation step.

By such an oxidation treatment, the Si radicals on the surface of the cured film formed in the above $Xe_2$ excimer light irradiation step are oxidized to be in a state where a hydroxy group is bonded to a silicon atom (—SiOH). In the production process of the present invention, the cured film in such a state is subjected to the second heat treatment, whereby siloxane bonds are formed on the surface of the cured film to prepare a high hardness surface, thereby to obtain a hard coating layer having sufficient abrasion resistance.

With respect to the temperature conditions in the second heat treatment, in the same manner as the above first heat treatment, the heat treatment is preferably carried out at a high temperature within a range where there will be no problem with respect to the heat resistance of the resin substrate, whereby the treatment can be completed quickly. Such temperature conditions are specifically preferably at least 80° C. and at most the heat deformation temperature of the resin substrate. In a case where a bisphenol A type polycarbonate resin is used as the resin substrate, it is more preferably within a range of from 80° C. to 140° C., further preferably within a range of from 80 to 130° C.

Further, as the heating means, the same method as the first heat treatment, specifically, a heating method by a natural convection incubator, a constant temperature drier, a hot air circulation system dryer, a forced air flow dryer or a vacuum drying apparatus, may, for example, be mentioned. Further, an electric furnace or the like may also be used. Further it is possible to optionally employ a heating means using an infrared lamp. Such heating means may be employed alone or in combination of two or more.

The time required for the above second heat treatment in the production process of the present invention is not particularly limited so long as —SiOH moieties on the surface of the cured film obtained by the oxidation treatment are sufficiently reacted to form siloxane bonds (—Si—O—Si—), but is preferably from 1 minute to 2 hours, particularly preferably from 5 minutes to 2 hours, especially preferably from 5 minutes to 1 hour.

(Formation of Primer Layer)

The resin substrate having a hard coating layer to be produced by the production process of the present invention may have a primer layer between the resin substrate and the hard coating layer, and it preferably has a primer layer so as to improve the adhesion between the resin substrate and the hard coating layer. The primer layer is not particularly limited, however, in the present invention, it is preferably formed by applying a primer composition containing an acrylic polymer, an ultraviolet absorber and a solvent to the resin substrate and drying the composition.

Such an acrylic polymer is preferably a homopolymer made of at least one member selected from acrylates and methacrylates having an alkyl group having at most 6 carbon atoms as "the main monomer", or a copolymer of such monomers. Here, "the main monomer" specifically means one contained in an amount of from 90 to 100 mol % based on the entire raw material monomers, and the same applies hereinafter. Further, also preferred is a copolymer of the above main monomer with at least one member of other acrylates and methacrylates. Such other monomers may, for example, be acrylates or methacrylates having an alkyl group having at least 7 carbon atoms or a cycloalkyl group having at most 12 carbon atoms. Further, it is also possible to use a copolymer obtainable by copolymerizing, together with such a monomer, a small amount of an acrylate or a methacrylate having a functional group-containing alkyl group (such as a hydroxyalkyl group). The cycloalkyl group may, for example, be a cyclohexyl group, a 4-methylcyclohexyl group, a 4-t-butylcyclohexyl group, an isobornyl group, a dicyclopentanyl group or a dicyclopentenyloxyethyl group.

Among them, preferred as the acrylic polymer to be used in the present invention is a polymer obtainable by polymerizing one or more members selected from methacrylates as the main monomer units. Further, preferred is a homopolymer or copolymer obtainable by polymerizing one or more alkyl methacrylates having an alkyl group having at most 6 carbon atoms, selected from methyl methacrylate, n-butyl methacrylate, tert-butyl methacrylate, ethyl methacrylate, isobutyl methacrylate and the like, as the main monomer, and more preferred is a homopolymer of methyl methacrylate, tert-butyl methacrylate, ethyl methacrylate or the like, or a copolymer of methyl methacrylate with one or more types selected from n-butyl methacrylate, ethyl methacrylate and isobutyl methacrylate.

Further, it is also possible to employ an acrylic polymer obtained by polymerizing or copolymerizing at least one member selected from acrylic monomers having a hydrolyzable silyl group and/or a SiOH group bonded via a C—Si bond.

Such acrylic monomers may, for example, be 3-methacryloyloxypropyltrimethoxysilane, 3-methacryloyloxypropylmethyldimethoxysilane, 3-methacryloyloxypropyldimethylmethoxysilane, 3-methacryloyloxypropyltriethoxysilane, 3-methacryloyloxypropylmethyldiethoxysilane, 3-acryloyloxypropyltrimethoxysilane, 3-acryloyloxypropylmethyldimethoxysilane, etc.

Further, such acrylic polymers to be used for forming a primer layer preferably have a mass average molecular weight of at least 20,000, more preferably at least 50,000 and preferably at most 1,000,000. An acrylic polymer having a mass average molecular weight within this range is preferred since the performance such as the adhesion or strength as a primer layer can be sufficiently provided.

The primer layer may contain an ultraviolet absorber in order to prevent yellowing of the resin substrate. As the ultraviolet absorber, the same one as the ultraviolet absorber contained in the above-described hard coating composition of the present invention may be employed. One of such ultraviolet absorbers may be used alone, or two or more of them may be used in combination. The content of the ultraviolet absorber in the primer layer is preferably from 1 to 50 parts by mass, particularly preferably from 1 to 30 parts by mass, per 100 parts by mass of the resin component such as the acrylic polymer, etc.

The primer layer may further contain a photostabilizer or the like. The photostabilizer may, for example, be a hindered amine; or a nickel complex such as nickel bis(octylphenyl) sulfide, nickel complex-3,5-di-tert-butyl-4-hydroxybenzyl phosphoric acid monoethylate or nickel dibutyl dithiocarbonate. Two or more of them may be used in combination. The content of the photostabilizer in the primer layer is preferably from 0.1 to 50 parts by mass, particularly preferably from 0.1 to 10 parts by mass, per 100 parts by mass of the resin component such as the acrylic polymer, etc.

A solvent is usually contained in the primer composition to be used for forming the primer layer. The solvent is not particularly limited so long as it is a solvent capable of stably dissolving the acrylic polymer. Specifically, it may, for example, be a ketone such as acetone, methyl ethyl ketone, methyl isobutyl ketone or cyclohexanone; an ether such as tetrahydrofuran, 1,4-dioxane or 1,2-dimethoxyethane; an ester such as ethyl acetate, butyl acetate or methoxyethyl acetate; an alcohol such as methanol, ethanol, 1-propanol, 2-propanol, 1-butanol, 2-butanol, 2-methyl-1-propanol, 2-methoxyethanol, 4-methyl-2-pentanol, 2-buthoxyethanol, 1-methoxy-2-propanol or diacetone alcohol; a hydrocarbon such as n-hexane, n-heptane, isooctane, benzene, toluene, xylene, gasoline, light oil or kerosene; acetonitrile, nitromethane or water. Two or more of them may be used in combination.

The amount of the solvent is preferably from 50 to 10,000 pars by mass, particularly preferably from 100 to 10,000 parts by mass, per 100 parts by mass of the resin component such as the acrylic polymer, etc. Further, the content of the non-volatile component (solid content) in the primer composition is preferably from 0.5 to 75 mass %, particularly preferably from 1 to 40 mass %, based on the total amount of the composition.

The above primer composition may further contain additives such as a leveling agent, a defoaming agent, a viscosity-adjusting agent, etc.

The method for applying the primer composition on the resin substrate is not particularly limited, but a spray coating method, a dip coating method or a flow coating method may, for example, be mentioned. Further, the heating conditions for drying are not particularly limited, but they are preferably from 50 to 140° C. for from 5 minutes to 3 hours.

The primer layer formed on the resin substrate by using the primer composition should have a thickness required to sufficiently bond the resin substrate and the hard coating layer and to maintain required amounts of the above additives, since if the primer layer is too thin, the effect of improving the adhesion between the resin substrate and the hard coating layer may sometimes be insufficient. Such a thickness of the primer layer is preferably at least 0.1 μm and at most 10 μm, particularly preferably at least 2 μm and at most 8 μm.

Here, in a case where the resin substrate having a hard coating layer to be produced by the production process of the present invention has the above primer layer, a hard coating layer is formed on the primer layer thus formed in the same manner as described above, whereby a resin substrate having a hard coating layer can be produced by the present invention.

<Resin Substrate Having Hard Coating Layer of the Present Invention>

The resin substrate having a hard coating layer of the present invention obtainable by the production process of the present invention has a structure such that not only a three dimensional crosslinking structure (network) by siloxane bonds is formed in the interior of the hard coating layer but also on the surface side of the hard coating layer, siloxane bonds are formed more strongly as compared with the interior of the hard coating layer. By having a hard coating layer of such a structure, the resin substrate having a hard coating layer of the present invention has a hardness gradient in the depth direction of the hard coating layer, has remarkably improved hardness particularly on the surface, and has excellent abrasion resistance as a whole.

Here, to determined "the hardness" of a thin film material such as the resin substrate having a hard coating layer of the present invention, i.e. mechanical strength such as abrasion resistance, usually, evaluation can be carried out by means of a microhardness measuring test. The microhardness measuring test is a test method to calculate the hardness from the indentation depth by an indenter under a specific load on the surface to be measured, and by this method, the Martens hardness corresponding to the scratch hardness can be known.

This hardness is an index of the abrasion resistance, and the resin substrate having a hard coating layer of the present invention obtainable by the production process of the present invention has a very high Martens hardness on the surface of the hard coating layer as compared with conventional one, for example, one in a state where only curing treatment before the $Xe_2$ excimer light irradiation treatment is applied, and thus it can be said that it has improved abrasion resistance.

Of the resin substrate having a hard coating layer of the present invention, the Martens hardness on the surface of the hard coating layer is specifically preferably at a level of from 200 to 850 $N/mm^2$ in a depth up to 150 nm from the surface.

The hard coating layer of the resin substrate having a hard coating layer of the present invention is characterized by having a remarkably high hardness on the surface as compared with that in the interior of the hard coating layer, as it is prepared by the production process of the present invention. The above microhardness measuring test is to measure the Martens hardness from the indentation formed by pressing an indenter in a loading/unloading test, and when the load is heavier, the indentation depth is deeper, whereby the Martens hardness at a deeper part can be measured, and when measurement is carried out with a light load, the indentation depth is shallow, and the Martens hardness at a portion closer to the surface can be measured. Thus, by comparing Martens hardnesses measured under different load conditions, the difference in the Martens hardness due to the difference in the depth from the hard coating layer surface can be evaluated.

Specifically, to evaluate the hard coating layer, a ratio of values of the Martens hardness obtained under the following measurement conditions may be employed.

(Evaluation 1)

A ratio of the Martens hardness ($HM_{(0.01)}$) measured at a loading rate/unloading rate F=0.01 mN/5 s with a creep C=5 s to the Martens hardness ($HM_{(0.5)}$) measured at a loading rate/unloading rate F=0.5 mN/5 s with a creep C=5 s, i.e. $HM_{(0.01)}/HM_{(0.5)}$.

(Evaluation 2)

A ratio of the Martens hardness ($HM_{(0.005)}$) measured at a loading rate/unloading rate F=0.005 mN/5 s with a creep C=5 s to the Martens hardness ($HM_{(0.5)}$) measured at a loading rate/unloading rate F=0.5 mN/5 s with a creep C=5 s, i.e. $HM_{(0.005)}/HM_{(0.5)}$.

With respect to the resin substrate having a hard coating layer of the present invention, $HM_{(0.01)}/HM_{(0.5)}$ of the hard coating layer is preferably from 1.10 to 1.80, more preferably from 1.10 to 1.65. Further, $HM_{(0.005)}/HM_{(0.5)}$ is preferably from 1.21 to 2.50, more preferably from 1.21 to 2.30. When $HM_{(0.005)}/HM_{(0.5)}$ is within such a range, the hard coating layer of the resin substrate having a hard coating layer of the present invention has a remarkably high hardness on the surface as compared with that in the interior of the hard coating layer, and has a hardness gradient in the depth direction of the hard coating layer. Thus, the hardness particularly on the surface is remarkably improved, and excellent abrasion resistance as a whole is obtained. Whereas, a resin substrate having a hard coating layer with $HM_{(0.005)}/HM_{(0.5)}$ less than 1.21, has substantially no hardness gradient in the depth direction of the hard coating layer, and thus no improvement in the abrasion resistance is observed.

EXAMPLES

Now, the present invention will be described in further detail with reference to Examples, but it should be understood that the present invention is by no means restricted by these Examples. Examples 1 to 5 are Examples of the present invention, and Examples 6 to 8 are Comparative Examples. Organopolysiloxanes were analyzed by the following method.

(1) Number (B) of Hydroxy Groups Bonded to Silicon Atoms/Number (A) of Alkoxy Groups Bonded to Silicon Atoms Organopolysiloxanes used in the following Examples were only those having methoxy groups bonded to silicon atoms (SiO—$CH_3$) as alkoxy groups bonded to silicon atoms, and therefore, as the above (B)/(A), a ratio of Si—OH/SiO—$CH_3$ obtained by the following method, was used.

Using an infrared absorption analyzer (FT-IR, model: Avatar/Nicolet FT-IR360, manufactured by Thermo Fisher Scientific K.K.), the ratio of Si—OH/SiO—$CH_3$ was obtained from the area ratio of the absorption attributable to SiO—$CH_3$ in the vicinity of 2,860 $cm^{-1}$ and the absorption attributable to Si—OH in the vicinity of 900 $cm^{-1}$.

(2) Analyses of Bonding States of Silicon Atoms in Organopolysiloxanes

The bonding states of silicon atoms in organopolysiloxanes contained in the hard coating composition, specifically, the abundance ratios of M units, D units, T units and Q units, and the abundance ratios of T0 to T3, were respectively obtained from the peak area ratios of $^{29}$Si-NMR by means of a nuclear magnetic resonance analyzer ($^{29}$Si-NMR: ECP400 manufactured by JEOL Ltd.). The measuring conditions are as follows.

A 10 mmφ test tube made of a polytetrafluoroethylene is used;
the probe: T10;
the resonant frequency: 79.42 MHz;
the pulse width: 10 μsec;
the waiting time: 20 sec;
the cumulated number: 1,500 times;
the relaxation agent: containing 0.1 mass % of Cr (acac)$_3$; and
the external standard sample: tetramethylsilane.

Further, the chemical shifts of $^{29}$Si-NMR attributable to the respective structures are as follows, in the case of a methyl type organopolysiloxane.
(M units to Q units)
M units: 15 to 5 ppm,
D units: −15 to −25 ppm,
T units: −35 to −75 ppm,
Q units: −90 to −130 ppm.
(T0 to T3)
T0: −40 to −41 ppm,
T1: −49 to −50 ppm,
T2: −57 to −59 ppm,
T3: −66 to −70 ppm.

(3) Number Average Molecular Weight Mn, Mass Average Molecular Weight Mw and Dispersivity Mw/Mn They were obtained by means of gel permeation chromatography (GPC, Waters 2695 manufactured by Waters Corporation, RI detection, column: Styragel guard colum+HR1+HR4+HR5E, eluent: chloroform).

[1] Synthesis of Organopolysiloxane (a) (MSi-1)

Into a 0.2 L flask, a methyl type silicone resin KR-500 (manufactured by Shin-Etsu Chemical Co., Ltd., comprising substantially only SiO—CH$_3$, no peak attributable to Si—OH groups observed by FT-IR, the abundance ratios of the respective T units are T0:T1:T2:T3=ND:15:58:27, Mn=700, Mw=1,240, Mw/Mn=1.77) (10 g) and 1-butanol (10 g) were added and thoroughly stirred, and acetic acid (10 g) and ion-exchanged water (10 g) were added and further thoroughly stirred. The obtained solution was stirred at 40° C. for one hour to obtain an organopolysiloxane (a) "MSi-1". This solution containing MSi-1 (MSi-1 concentration: 25 mass %) was used as it was for the after-described [3] Preparation of hard coating composition.

With respect to the obtained MSi-1, a comparison with KR-500 being the raw material was carried out by means of FT-IR, whereby a decrease of the peak attributable to SiO—CH$_3$ groups and an appearance of the peak attributable to Si—OH groups were confirmed. The ratio of Si—OH/SiO—CH$_3$ in MSi-1 obtained from the peak area ratio of FT-IR was 41.0. MSi-1 was composed solely of T units, and the abundance ratios of the respective T units obtained from the chemical shifts of 29Si-NMR were T0:T1:T2:T3=ND: 1.1:30.1:68.8. Mn of MSi-1 was 520, Mw was 1,150, and Mw/Mn was 2.22.

[2] Synthesis of Organopolysiloxane (b) (PSi-1) and Preparation of Organopolysiloxane (b) Composition Solution Into a 1 L flask, 200 g of aqueous colloidal silica having an average particle size of about 15 nm (pH 3.1, fine silica particle solid content: 35 mass %) and 0.2 g of acetic acid were charged, and 138 g methyltrimethoxysilane was added. After stirring for one hour, this composition was aged at 25° C. for 4 days to ensure the partial hydrolytic condensation product in the silica/methanol aqueous dispersion.

In this composition, the non-volatile component was 40 mass %, and the obtained organopolysiloxane (hereinafter referred to as the organopolysiloxane (b) "PSi-1") had bond structures composed mainly of T units (number of T units: total number of M units, D units and Q units=100:0), and the abundance ratios of the respective T units obtained from the chemical shifts of $^{29}$Si-NMR were T0:T1:T2:T3=ND (not detected):2:54:44. In the obtained organopolysiloxane, monomer-form T0 [R—Si(OH)$_3$] (wherein R is a monovalent organic group) was not substantially present, and it was confirmed that the starting material methyltrimethoxysilane was substantially completely converted to an oligomer-form organopolysiloxane. Mn of the obtained organopolysiloxane (b) PSi-1 was 400, Mw was 670, and Mw/Mn was 1.68.

To 100 parts by mass of the organopolysiloxane (b) PSi-1 solution obtained as described above (containing fine silica particles (c)), 4 parts by mass of a benzophenone type ultraviolet absorber was added, followed by aging at 25° C. for at least 24 hours. By using 1-butanol and isopropanol as diluting solvents, an organopolysiloxane (b) PSi-1 composition solution having 25 mass % of a non-volatile component (150° C., 45 minutes) and a viscosity of 4.4 mPa·s was prepared. The pH of the composition was stabilized at 5.0.

[3] Preparation of Hard Coating Composition

80 Parts of the organopolysiloxane (b) composition solution containing the organopolysiloxane (b) PSi-1 obtained in the above [2] and 20 parts of the solution containing the organopolysiloxane (a) MSi-1 obtained in the above [1] were mixed to obtain a hard coating composition HC-1.

[4] Preparation of Resin Substrate Sample Having Hard Coating Layer

By using the hard coating composition obtained in the above [3], resin substrate samples having a hard coating layer in Examples and Comparative Examples were prepared as follows. In the following preparation of samples, as a heating means, a hot air circulation system drier (manufactured by SANYO Electric Co., Ltd., CONVECTION OVEN, MOV-202F) was used. As a Xe$_2$ excimer light irradiation means, a Xe$_2$ excimer lamp light source (manufactured by Excimer Inc., E500-172) was used.

<1> Preparation of Resin Substrate Having Cured Film of Hard Coating Composition To a polycarbonate resin plate having a thickness of 3 mm (CARBOGLASS (registered trademark) Polish Clear (tradename, manufactured by Asahi Glass Company, Limited)), an acrylic primer SHP470 (tradename, manufactured by Momentive Performance Materials, Inc., solid content 10 mass % solution) was applied by a dipping method so that the film thickness after drying would be from 4 to 5 μm, followed by heat drying for 30 minutes by means of the hot air circulation system dryer set at 120° C., to form a primer layer. Then, to the obtained primer layer, the hard coating composition HC-1 was applied by a dipping method to form a coating film of HC-1, which was maintained at 25° C. for 20 minutes, followed by heat treatment by the hot air circulation system dryer set at 120° C. for 1 hour to cure the coating film, thereby to prepare a resin substrate having a cured film of the hard coating composition. The thickness of the cured film thus obtained by the first heat treatment was 2.9 μm. This sample has a primer layer and a cured film of the hard coating composition on both sides of the polycarbonate plate.

Example 1

The resin substrate (50 mm×50 mm) having a cured film of the hard coating composition obtained in the above <1> was set at a position of 1 mm from a $Xe_2$ excimer lamp light source (manufactured by Excimer Inc., E500-172, emission irradiance: 10 mW/cm$^2$) in a sealed apparatus so that one side of the cured film faced the $Xe_2$ excimer lamp light source, and the $Xe_2$ excimer lamp light was applied for 2 minutes uniformly to the entire cured film facing the lamp light source as the $Xe_2$ excimer lamp light irradiation treatment. Then, this resin substrate was taken out from the apparatus and exposed to the air atmosphere to apply the oxidation treatment, and as the second heat treatment, a heating treatment for 1 hour was carried out by the hot air circulation type dryer set at 120° C. to prepare a resin substrate sample having a hard coating layer.

Further, the $Xe_2$ excimer light irradiance on the surface of the cured film by the $Xe_2$ excimer light irradiation treatment was measured, whereupon the irradiance was 10 mW/cm$^2$, and the $Xe_2$ excimer light irradiation energy received by the surface of the cured film was 1,200 mJ/cm$^2$.

The thickness of the hard coating layer of the resin substrate having a hard coating layer obtained was 2.9 µm, and was not changed from the thickness of the cured film. This sample has a primer layer and a hard coating layer on both sides of the polycarbonate plate, and on one side, these layers are a cured film of the hard coating composition, and only on one side to which the $Xe_2$ excimer light was applied, the hard coating layer light-modified by the $Xe_2$ excimer light irradiation of the present invention is formed. The presence or absence of defect was visually judged and as a result, the sample had no problem on the initial appearance.

Examples 2 to 5

By using the resin substrate having a cured film of the hard coating composition obtained in the above <1>, in the same manner as in Example 1 except for the time and conditions of irradiation with the $Xe_2$ excimer light and the thickness of the hard coating layer, the $Xe_2$ excimer light irradiation treatment of applying the $Xe_2$ excimer lamp light to one side of the cured film of the above resin substrate for 5 minutes (Example 2), 10 minutes (Example 3) or 15 minutes (Example 4) was carried out. Then, each resin substrate was taken out from the apparatus, followed by the same heating treatment as in Example 1 to prepare a sample of the resin substrate having a hard coating layer.

In Example 5, by using the resin substrate having a cured film of the hard coating composition obtained in the above <1>, in the same manner as in Example 1 except for the irradiation atmosphere and the irradiation time, and the thickness of the hard coating layer, the $Xe_2$ excimer light irradiation treatment was applied to one side of the cured film on the above resin substrate in an atmosphere (oxygen concentration: 4.2 vol %) having dry air and nitrogen mixed in a volume ratio of 1:4 for 15 minutes. Then, the resin substrate was taken out from the apparatus, followed by the same heating treatment as in Example 1 to prepare a sample of the resin substrate having a hard coating layer.

The thickness of the hard coating layer of the resin substrate having a hard coating layer obtained was 2.8 µm in Example 2, 3.0 µm in Example 3 and 3.1 µm in Example 4, and 3.3 µm in Example 5, and the thickness in each Example was not substantially changed from the thickness of the cured film. All the samples except for Example 4 had no problem on the initial appearance. By this $Xe_2$ excimer light irradiation treatment, the $Xe_2$ excimer light irradiation energy received by the surface of the cured film was 3,000 mJ/cm$^2$ in Example 2, 6,000 mJ/cm$^2$ in Example 3 and 9,000 mJ/cm$^2$ in Example 4. Further, in Example 5, the $Xe_2$ excimer light irradiation energy on the surface of the cured film is 9,000 mJ/cm$^2$ which is the same as in Example 4 without reduction by the atmosphere, however, considering the absorption by oxygen, the $Xe_2$ excimer light irradiation energy practically received by the surface of the cured film is estimated to be smaller.

In Example 4, initial cracks were formed, and defect in the initial appearance was observed. This is considered to be such that by the $Xe_2$ excimer lamp light, the Si—CH$_3$ groups present on the cured film to which the first heat treatment was applied were light-modified to Si—OH groups, and when they are converted to Si—O—Si groups by heat curing, initial cracks were formed due to the shrinkage stress by shrinkage on curing. The depth of the cracks measured by using a surface profile microscope (manufactured by KEYENCE CORPORATION, Profile micrometer VF-7500, 7510) was about 400 nm, and this depth is estimated to be a depth light-modified by irradiation with the $Xe_2$ excimer lamp light for 15 minutes (9,000 mJ/cm$^2$).

Example 6

The resin substrate having a cured film of the hard coating composition obtained in the above <1> was subjected to the after-mentioned evaluations as it was as the resin substrate having a hard coating layer ($Xe_2$ excimer lamp light non-irradiated sample).

Example 7

By using the resin substrate having a cured film of the hard coating composition obtained in the above <1>, in the same manner as in the above Example 1 except for the irradiation time and conditions and the thickness of the hard coating layer, the $Xe_2$ excimer light irradiation treatment of applying the $Xe_2$ excimer lamp light to one side of the cured film on the resin substrate in a nitrogen atmosphere (oxygen concentration: at most 1 vol %) for 5 minutes ($Xe_2$ excimer light irradiation energy: 3,000 mJ/cm$^2$) was carried. Here, a heat treatment (second heat treatment) after the resin substrate was taken out from the apparatus was not carried out.

The thickness of the hard coating layer of the resin substrate obtained was 3.2 µm, and which was not substantially changed from the thickness of the cured film. This sample has a primer layer and a hard coating layer on both sides of the polycarbonate plate, and on one side, these layers are a cured film of the hard coating composition, and on the other side, a hard coating layer was formed which was produced by a production process comprising the $Xe_2$ excimer light irradiation treatment but without the subsequent heat treatment, which is out of the range of the present invention. The presence or absence of defect was visually judged and as a result, the sample had no problem on the initial appearance.

Example 8

By using the resin substrate having a cured film of the hard coating composition obtained in the above <1>, a sample of a resin substrate having a hard coating layer was prepared in the same manner as in Example 1 except that the $Xe_2$ excimer lamp light irradiation was carried out in a dry air atmosphere (oxygen concentration: 21 vol %) instead of in the nitrogen atmosphere (oxygen concentration: at most 1 vol %) and that the $Xe_2$ excimer lamp light irradiation time was minutes ($Xe_2$ excimer light irradiation energy: 3,000 mJ/cm$^2$).

In Example 8, the $Xe_2$ excimer light irradiation energy on the surface of the cured film was 3,000 mJ/cm² which is the same as in Example 2 without reduction by the atmosphere, however, considering the absorption by oxygen, the $Xe_2$ excimer light irradiation energy practically received by the surface of the cured film is estimated to be smaller.

The thickness of the hard coating layer of the resin substrate obtained was 2.9 μm and was not changed from the thickness of the cured film. This sample has a primer layer and a hard coating layer on both sides of the polycarbonate plate, and on one side, these layers are a cured film of the hard coating composition, and on the other side, a hard coating layer was formed which was prepared by the $Xe_2$ excimer light irradiation treatment under conditions out of the range of the present invention. There was no problem on the initial appearance.

[5] Evaluation of Resin Substrate Sample Having Hard Coating Layer

With respect to the resin substrate samples having a hard coating layer obtained in Examples in the above [4], the evaluations of the following items were carried out.

<1> Thickness (Thicknesses of Hard Coating Layer and Primer Layer)

The thicknesses of the hard coating layer and the primer layer of each sample were measured by using an interference film thickness measuring apparatus (manufactured by Spectra Co-op, Solid Lambda Thickness) At that time, as the refractive index, values of n=1.46 (hard coating layer) and n=1.56 (primer layer) were used.

<2> Degree of Reduction of Si—$CH_3$ Groups Due to $Xe_2$ Excimer Light Irradiation The Si—$CH_3$ groups are reduced due to the $Xe_2$ excimer light irradiation. The degree of reduction of the Si—$CH_3$ groups on the hard coating layer of each sample was measured. The amount of Si—$CH_3$ present in a predetermined amount of each of the cured film (initial) of the hard coating composition before the $Xe_2$ excimer light irradiation and the hard coating layer (specimen) after the $Xe_2$ excimer light irradiation under various conditions was measured by an infrared absorption analyzer (FT-IR, model: Avatar/Nicolet FT-IR360, manufactured by Thermo Fisher Scientific K.K.), and their ratio in amount was calculated, which was inserted in the following formula (I) to determine the degree of reduction.

Degree of reduction of Si—$CH_3$ groups=1−
$(A_{Si-CH3, \text{ specimen}, 1270 \text{ cm-1}} / A_{Si-CH3, \text{ initial}, 1270 \text{ cm-1}})$ (1)

In this above formula (I), $A_{Si-CH3, \text{ initial}, 1270 \text{ cm-1}}$ and $A_{Si-CH3, \text{ specimen}, 1270 \text{ cm-1}}$ are areas of absorption attributable to Si—$CH_3$ which appears in the vicinity of 1,270 cm$^{-1}$ measured by the infrared absorption analyzer (FT-IR) of the cured film of the hard coating composition before the $Xe_2$ excimer light irradiation (initial, i.e. the cured film to which the first heat treatment was applied) and the hard coating layer (specimen) after the $Xe_2$ excimer light irradiation under various conditions.

<3> Surface Compositional Analysis of Resin Substrate Having Hard Coating Layer

With respect to the samples obtained in Examples 2 and 3 and the sample obtained in Example 6, wild scanning surface compositional analysis was carried out by a scanning X-ray photoelectron spectrometer (μ-ESCA, manufactured by ULVAC-PHI, Inc., Quantera SXM). In order to remove the organic contamination on the surface, sputtering was carried out in 7 nm (as calculated as $SiO_2$) from the surface by argon ions, followed by measurement. As the X-ray source, monochromatized AlKα by a monochrometer was employed, the measurement area diameter was 100 μmφ, the pass energy was 224 eV, the step energy was 0.4 eV, the sample angle was 45°, and the sputtering conditions were 2 kV for 3×3 mm².

<4> Initial Appearance

The hard coating layer in the initial state of each sample obtained in the above [4] was visually observed, and the presence or absence of defect was judged.

○ (pass): No defect observed

X (rejection): Cracks observed on hard coating layer

<5> Evaluation of Abrasion Resistance

In accordance with JIS K5600 (5.9), on a Taber abrasion tester (model ROTARY ABRASION TESTER, manufactured by Toyo Seiki Seisaku-sho, Ltd.), a truck wheel CALIBRASE (registered trademark) CS-10F (manufactured by TABER Industries) was mounted and rotated 500 times under a load of 500 g, whereupon the haze was measured, and the haze difference $\Delta H_{500}$ between before and after the test was taken as the abrasion resistance. The haze was measured in accordance with JIS K7105 (6.4) by means of a haze meter (model: HGM-2 manufactured by Suga Test Instruments Co., Ltd.). The evaluation standards are as follows.

○ (pass): $\Delta H_{500} \leq 5$

X (rejection): $\Delta H_{500} > 5$

In Table 2, the results of the evaluation of the abrasion resistance was represented as abrasion resistance.

<6> Measurement of Microhardness of Resin Substrate Having Hard Coating Layer

With respect to the surface of the hard coating layer of each of the samples obtained in Example 1 to 8, a Vickers pyramid indenter was set to a microhardness tester (manufactured by Fischer Instruments K.K., PICODENTOR HM500), and a loading/unloading test was carried out to measure a load/indentation depth curve. Here, the loading rate F was 0.5, 0.1, 0.01 or 0.005 mN/5 s, the creep C was 5 s, and the unloading rate F was the same as the loading rate. The measurement data were treated by WIN-HCU manufactured by Fischer Instruments K.K.), to determine the Martens hardness HM (N/mm²) indicating the scratch hardness and the press depth hmax (nm). Further, the ratio of $HM_{(0.01)}$ at a loading rate F=0.01 mN/5 s to $HM_{(0.5)}$ at a loading rate F=0.5 mN/5 s, i.e. $HM_{(0.01)}/HM_{(0.5)}$, and the ratio of $HM_{(0.005)}$ at a loading rate F=0.005 mN/5 s to $HM_{(0.5)}$ at a loading rate F=0.5 mN/5 s, i.e. $HM_{(0.005)}/HM_{(0.5)}$ were calculated.

In Table 2, the results of the above microhardness measurement was represented as microhardness measurement load F.

The thicknesses of the hard coating layer and the primer layer, the degree of reduction of the Si—$CH_3$ groups due to the $Xe_2$ excimer light irradiation and the results of the surface compositional analysis of the hard coating layer obtained above are shown in Table 1 together with the production conditions, and the results of the initial appearance, the evaluation of abrasion resistance and the microhardness measurement are shown in Table 2 together with the production conditions.

In Tables 1 and 2, the $Xe_2$ excimer light irradiation energy in each of Examples 5 and 8 is the output energy of the $Xe_2$ excimer lamp, not the practical irradiation energy on the surface of the cured film. In other Examples, the $Xe_2$ excimer light irradiation energy on the surface of the cured film is shown.

TABLE 1

| | Xe₂ excimer light irradiation conditions | | | | Heat treatment conditions after Xe₂ excimer light irradiation step | Thickness of primer layer [μm] | Thickness of hard coating layer after treatment [μm] | Degree of reduction of Si—CH₃ groups | Surface compositional analysis | | | |
|---|---|---|---|---|---|---|---|---|---|---|---|---|
| | Irradiation time [min] | Irradiation energy [mJ/cm²] | Atmosphere | Oxygen concentration [vol %] | | | | | C1s | O1s | Si2p | C/Si |
| Ex. 1 | 2 | 1200 | N₂ | ≤1 | 120° C., 1 hr | 4.6 | 2.9 | 0.20 | — | — | — | — |
| Ex. 2 | 5 | 3000 | N₂ | ≤1 | 120° C., 1 hr | 4.3 | 2.8 | 0.30 | 1.6 | 67.9 | 30.4 | 0.054 |
| Ex. 3 | 10 | 6000 | N₂ | ≤1 | 120° C., 1 hr | 4.5 | 3.0 | 0.45 | 1.7 | 67.9 | 30.5 | 0.057 |
| Ex. 4 | 15 | 9000 | N₂ | ≤1 | 120° C., 1 hr | 4.4 | 3.1 | 0.51 | — | — | — | — |
| Ex. 5 | 15 | 9000 | dry air + N₂ (1:4) | 4.2 | 120° C., 1 hr | 4.4 | 3.3 | 0.32 | — | — | — | — |
| Ex. 6 | — | — | — | — | — | 4.8 | 2.9 | — | 4.1 | 65.8 | 30.1 | 0.136 |
| Ex. 7 | 5 | 3000 | N₂ | ≤1 | Nil | 4.9 | 3.2 | 0.12 | — | — | — | — |
| Ex. 8 | 5 | 3000 | dry air | 21 | 120° C., 1 hr | 4.8 | 2.9 | 0.02 | — | — | — | — |

TABLE 2

| | Xe₂ excimer light irradiation conditions | | | | Heat treatment conditions after Xe₂ excimer light irradiation step | Initial appearance | Abrasion resistance |
|---|---|---|---|---|---|---|---|
| | Irradiation time [min] | Irradiation energy [mJ/cm²] | Atmosphere | Oxygen concentration [vol %] | | | |
| Ex. 1 | 2 | 1200 | N₂ | ≤1 | 120° C., 1 hr | ○ | ○ |
| Ex. 2 | 5 | 3000 | N₂ | ≤1 | 120° C., 1 hr | ○ | ○ |
| Ex. 3 | 10 | 6000 | N₂ | ≤1 | 120° C., 1 hr | ○ | ○ |
| Ex. 4 | 15 | 9000 | N₂ | ≤1 | 120° C., 1 hr | X | ○ |
| Ex. 5 | 15 | 9000 | dry air + N₂ (1:4) | 4.2 | 120° C., 1 hr | ○ | ○ |
| Ex. 6 | — | — | — | — | — | ○ | X |
| Ex. 7 | 5 | 3000 | N₂ | ≤1 | Nil | ○ | X |
| Ex. 8 | 5 | 3000 | dry air | 21 | 120° C., 1 hr | ○ | X |

| | Microhardness measurement Load F [mN/5 sec] | | | | | | | | HM ratio | |
|---|---|---|---|---|---|---|---|---|---|---|
| | F = 0.5 | | F = 0.1 | | F = 0.01 | | F = 0.005 | | | |
| | $HM_{0.5}$ [N/mm²] | Press depth (nm) | $HM_{0.1}$ [N/mm²] | Press depth (nm) | $HM_{0.01}$ [N/mm²] | Press depth (nm) | $HM_{0.005}$ [N/mm²] | Press depth (nm) | $HM_{0.01}/HM_{0.5}$ | $HM_{0.005}/HM_{0.5}$ |
| Ex. 1 | 190 | 320 | 214 | 140 | 252 | 41 | 340 | 28 | 1.33 | 1.79 |
| Ex. 2 | 228 | 290 | 251 | 130 | 258 | 40 | 450 | 23 | 1.13 | 1.97 |
| Ex. 3 | 295 | 258 | 407 | 100 | 462 | 32 | 656 | 21 | 1.57 | 2.22 |
| Ex. 4 | 372 | 230 | 463 | 92 | 608 | 26 | 840 | 19 | 1.63 | 2.26 |
| Ex. 5 | 198 | 290 | 222 | 125 | 260 | 45 | 380 | 30 | 1.31 | 1.92 |
| Ex. 6 | 164 | 350 | 180 | 150 | 173 | 50 | 196 | 36 | 1.05 | 1.20 |
| Ex. 7 | 155 | 340 | 159 | 150 | 151 | 46 | 158 | 38 | 0.97 | 1.02 |
| Ex. 8 | 165 | 340 | 179 | 145 | 171 | 46 | 197 | 35 | 1.04 | 1.19 |

The samples in Example 1 to 5 obtained by the production process of the present invention have remarkably improved abrasion resistance as compared with the sample in Example 6 in which only conventional heat curing was carried out and no Xe₂ excimer light irradiation was carried out, the sample in Example 7 in which no heat curing was carried out after the Xe₂ excimer light irradiation, and the sample in Example 8 in which the Xe₂ excimer light irradiation was carried out in dry air having an oxygen concentration of 21 vol %, which is out of the range of the oxygen concentration of at most 5 vol % of the production process of the present invention, which failed with respect to the abrasion resistance. Improvement in the abrasion resistance in Examples 1 to 5 is considered to be due to a high degree of reduction of the Si—CH₃ groups on the surface of the cured film of the hard coating composition, thus accelerating hardening by formation of the siloxane bonds.

In the samples obtained in Examples 1 to 5, a change of the Martens hardness corresponding to the scratch hardness was observed at a load (loading rate) F=0.5 to 0.005 mN/5 s (press depth of from 19 to 320 nm). The values of the Martens hardness in Examples 1 to 5 are about from 1.7 to 4.3 times of the non-irradiated sample (Example 6) at a load (loading rate) F=0.005 mN/5 s (press depth of from 19 to 30 nm), and are about from 1.1 to 2.3 times at a load (loading rate) F=0.5 mN/5 s (press depth of from 230 to 320 nm). Further, the samples obtained in Examples 1 to 5 have $HM_{(0.01)}/HM_{(0.5)}$ of at least 1.13 and $HM_{(0.005)}/HM_{(0.5)}$ of at least 1.79, whereupon it is found that the resin substrate having a hard coating layer obtainable by the production process of the present invention is a resin substrate having a hard coating layer having a Martens hardness gradient.

This suggests that the Si—OH groups are converted to Si—O—Si groups by heat treatment carried out after the $Xe_2$ excimer light irradiation and the oxidation treatment, and it is possible to harden only a portion in the very vicinity of the surface.

The sample obtained in Example 4 has defect in the appearance, since the $Xe_2$ excimer light irradiation energy applied to the surface of the cured film of the hard coating composition was so high as 9,000 mJ/cm$^2$, but as compared with other Examples, the degree of reduction of the Si—CH$_3$ groups is high, and the Martens hardness is from 2.3 to 4.3 times of the sample in Example 6 at a load (loading rate) F=0.5 to 0.005 mN/5 s (press depth of from 19 to 230 nm) and the surface hardening was accelerated, and it has very good abrasion resistance. As in the case of the sample obtained in Example 4, the application of the resin substrate having a hard coating layer may be limited. Considering this, in the present invention, the $Xe_2$ excimer light irradiation energy to be applied to the surface of the cured film of the hard coating composition is more preferably from 500 to 8,000 mJ/cm$^2$.

On the other hand, of the sample in Example 6 which was not irradiated with the $Xe_2$ excimer light, the Martens hardness does not substantially change at a press depth of from 36 to 350 nm. The same applies to the sample in Example 7 in which no heat treatment was conducted after application of the $Xe_2$ excimer light for 5 minutes and the sample in Example 8 in which the $Xe_2$ excimer light irradiation was carried out in the dry air having an oxygen concentration of 21 vol % which is out of the range of the oxygen concentration of at most 5 vol % of the production process of the present invention. Further, the samples obtained in Examples 6 to 8 have $HM_{(0.01)}/HM_{(0.5)}$ of at most 1.05 and $HM_{(0.005)}/HM_{(0.5)}$ of at most 1.20, and they are found to be a resin substrate having a hard coating layer having substantially no Martens hardness gradient.

This suggests that both of the $Xe_2$ excimer light irradiation step and the oxidation treatment/heat treatment step are essential to harden the surface of the cured film of the hard coating composition and that control of the oxygen concentration in the atmosphere to be within the range of the present invention in the $Xe_2$ excimer light irradiation step is essential to harden the surface of the cured film of the hard coating composition.

From the above results, it is found that according to the process for producing a resin substrate having a hard coating layer of the present invention, the Martens hardness on the surface of the hard coating layer increases with a gradient toward the surface, whereby a resin substrate having a hard coating layer having drastically improved abrasion resistance can be obtained. The reason is considered to be such that by the $Xe_2$ excimer light irradiation in a $N_2$ atmosphere having an oxygen concentration of at most 5 vol %, the bonds of the Si—CH$_3$ groups on the surface are cleaved to form radicals, then oxidized in the air and then converted to Si—OH groups, and further by the second heat treatment, the Si—OH groups are converted to Si—O—Si groups. Thus, hardening of the surface of the hard coating layer is possible, the hard coating layer can have a Martens hardness gradient and as a result, the abrasion resistance can drastically be improved.

On the other hand, with respect to the sample in Example 8 produced by a production process out of the range of the production process of the present invention, oxygen contained in the dry air selectively absorbs the $Xe_2$ excimer light and as a result, the Si—CH$_3$ groups on the surface of the hard coating will not be converted to Si—OH groups and accordingly they are not converted to Si—O—Si groups by the subsequent heat curing, hardening of the surface is suppressed, and thus the sample failed with respect to the abrasion resistance. Further, oxygen which absorbs the $Xe_2$ excimer light is converted to ozone, and this ozone is considered to accelerate deterioration of the surface of the hard coating layer and the primer layer and further the substrate, such being undesirable.

In the hard coating layer in the samples in Examples 2 and 3, by the surface compositional analysis, the C/Si ratio was 0.054 and 0.057, which are substantially the same. On the other hand, in the $Xe_2$ excimer light non-irradiated sample in Example 6, the C/Si ratio was 0.136. In this surface compositional analysis, analysis was conducted by using a sample subjected to argon sputtering, and accordingly the obtained C concentration is slightly lower than the practical value in consideration from the charged amount of silicone and silica. This is considered to be because some of the bonds of the Si—CH$_3$ groups are cleaved at the time of sputtering, and the relative comparison between them definitely supports the behavior of reduction of the Si—CH$_3$ groups by FT-IR analysis of the $Xe_2$ excimer light irradiated sample and the non-irradiated sample.

From the above results, it is found that both of the $Xe_2$ excimer light irradiation step with an oxygen concentration of at most 5 vol % and the oxidation treatment/heat treatment step in the production process of the present invention are essential to harden the surface of the cured film of the hard coating composition.

INDUSTRIAL APPLICABILITY

The resin substrate having a hard coating layer obtainable by the production process of the present invention has excellent abrasion resistance and is useful as a window glass for a vehicle, to be attached to automobiles or various means of transportation, or as a window glass for a building material to be attached to building construction such as houses or buildings.

This application is a continuation of PCT Application No. PCT/JP2011/051126, filed on Jan. 21, 2011, which is based upon and claims the benefit of priority from Japanese Patent Application No. 2010-012228 filed on Jan. 22, 2010. The contents of those applications are incorporated herein by reference in its entirety.

What is claimed is:

1. A process for producing a resin substrate having a hard coating layer on at least one side of a resin substrate, comprising, in the following order:
   (1) applying a hard coating composition comprising an organopolysiloxane to at least one side of the resin substrate to form a coating film of the composition, and then applying a first heat treatment to the coating film to cure the organopolysiloxane, thereby forming a cured film, wherein said organopolysiloxane is present in an amount of 50 to 100 mass %, based on the total amount of the hard coating composition, excluding any solvent, and wherein in a interior of the cured film, a three dimensional crosslinking structure is formed by siloxane bonds, and on a surface of the cured film, structures of a monovalent organic group in which an alkyl group having 1 to 10 carbon atoms is bonded to a silicon atom, are present;

(2) irradiating the cured film having the three dimensional crosslinking structure with a $Xe_2$ excimer light having an irradiation energy of from 500 to 8,000 $mJ/cm^2$, in an atmosphere having an oxygen concentration of at most 5 vol %, wherein at least some of the bonds between silicon atoms and carbon atoms present on the surface of the cured film are cleaved to form silicon radicals, such that a content of Si—$CH_3$ groups on the surface of the cured film measured by FT-IR after the $Xe_2$ excimer light irradiation treatment ($A_{after}$) is reduced compared with a content of Si—$CH_3$ groups on the surface of the cured film measured by FT-IR before the $Xe_2$ excimer light irradiation treatment ($A_{initial}$), and a degree of a reduction of Si—$CH_3$ groups shown by formula: 1-($A_{after}/A_{initial}$) is from 0.05 to 0.45; and (3) applying an oxidation treatment to the cured film obtained by (2) wherein the silicon radicals on the surface of the cured film are oxidized to be in a state where a hydroxyl group is bonded to a silicon atom, thereby forming —SiOH moieties, and then further applying a second heat treatment to form the hard coating layer, wherein the —SiOH moieties are reacted to form siloxane bonds, wherein the hard coating layer has a hardness gradient in the depth direction of the hard coating layer such that the hard coating layer has a Martens hardness in a depth up to 150 nm from the surface of from 200 to 850 $N/mm^2$, which is larger than a Martens hardness of an interior of the hard coating layer.

2. The process for producing a resin substrate having a hard coating layer according to claim 1, wherein the second heat treatment is a treatment of maintaining the cured film at a temperature of at least 80° C. and at most the heat deformation temperature of the resin substrate for from 5 to 120 minutes.

3. The process for producing a resin substrate having a hard coating layer according to claim 1, wherein the proportion in number of T units in the organopolysiloxane is from 70 to 100%.

4. The process for producing a resin substrate having a hard coating layer according to claim 1, wherein the organopolysiloxane is composed solely of T units and Q units, and the ratio in number of T:Q is from 90 to 100:10 to 0.

5. The process for producing a resin substrate having a hard coating layer according to claim 1, wherein before the cured film forming step, a step of applying a primer composition to at least one side of the resin substrate and drying it to form a primer layer is further carried out, and in the cured film forming step, the hard coating composition is applied to the primer layer.

6. The process for producing a resin substrate having a hard coating layer according to claim 1, wherein the material of the resin substrate is a polycarbonate resin.

7. The process for producing a resin substrate having a hard coating layer according to claim 1, wherein the curing temperature is from 50 to 200° C. for the first heat treatment.

8. The process for producing a resin substrate having a hard coating layer according to claim 1, wherein the curing temperature is from 80 to 160° C. for the first heat treatment.

9. The process for producing a resin substrate having a hard coating layer according to claim 1, wherein the curing temperature is from 100 to 140° C. for the first heat treatment.

10. The process for producing a resin substrate having a hard coating layer according to claim 1, wherein said oxygen concentration is at most 3 vol %.

11. The process for producing a resin substrate having a hard coating layer according to claim 1, wherein said oxygen concentration is at most 1 vol %.

12. The process for producing a resin substrate having a hard coating layer according to claim 1, wherein said organopolysiloxane is present in an amount of 60 to 95 mass %, based on the total amount of the hard coating composition, excluding any solvent.

13. The process for producing a resin substrate having a hard coating layer according to claim 1, wherein the degree of a reduction of Si—$CH_3$ groups shown by formula: 1-($A_{after}/A_{initial}$) is from 0.20 to 0.45.

14. The process for producing a resin substrate having a hard coating layer according to claim 1, wherein the cured film having the three dimensional crosslinking structure is irradiated with a $Xe_2$ excimer light having an irradiation energy of from 1000 to 8,000 $mJ/cm^2$.

15. A resin substrate having a hard coating layer obtained by the production process as defined in claim 1.

16. The resin substrate having a hard coating layer according to claim 15, wherein the ratio $HM_{(0.005)}/HM_{(0.5)}$ of the Martens hardness ($HM_{(0.005)}$) measured at a loading/unloading rate F=0.005 mN/5 s with a creep C=5 s to the Martens hardness ($HM_{(0.5)}$) measured at a loading/unloading rate F=0.5 mN/5 s with a creep C=5 s, on the surface of the hard coating layer, is from 1.21 to 2.22.

17. The resin substrate having a hard coating layer according to claim 15, wherein the ratio $HM_{(0.01)}/HM_{(0.5)}$ of the Martens hardness ($HM_{(0.01)}$) measured at a loading/unloading rate F=0.01 mN/5 s with a creep C=5 s to the Martens hardness ($HM_{(0.5)}$) measured at a loading/unloading rate F=0.5 mN/5 s with a creep C=5 s, on the surface of the hard coating layer, is from 1.10 to 1.57.

* * * * *